(12) United States Patent
Murata et al.

(10) Patent No.: US 8,488,043 B2
(45) Date of Patent: Jul. 16, 2013

(54) IMAGING APPARATUS, RECORDING MEDIUM FOR RECORDING A COMPUTER PROGRAM, AND IMAGING CONTROL METHOD

(75) Inventors: Ryo Murata, Musashimurayama (JP); Takashi Onoda, Ome (JP); Osamu Nojima, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 609 days.

(21) Appl. No.: 11/906,075

(22) Filed: Sep. 28, 2007

(65) Prior Publication Data

US 2008/0079817 A1    Apr. 3, 2008

(30) Foreign Application Priority Data

Sep. 28, 2006 (JP) ................................. 2006-263745
Dec. 8, 2006 (JP) ................................. 2006-332488

(51) Int. Cl.
*H04N 5/222* (2006.01)
*H04N 5/262* (2006.01)

(52) U.S. Cl.
USPC .............. 348/333.12; 348/222.1; 348/333.01; 348/333.11

(58) Field of Classification Search
None
See application file for complete search history.

(56) References Cited

U.S. PATENT DOCUMENTS

| | | | |
|---|---|---|---|
| 6,350,238 B1 * | 2/2002 | Olstad et al. ................... | 600/437 |
| 6,433,821 B1 | 8/2002 | Gouhara et al. | |
| 6,731,799 B1 | 5/2004 | Sun et al. | |
| 6,734,910 B1 * | 5/2004 | Yumoto et al. ............ | 348/333.12 |
| 7,057,745 B1 | 6/2006 | Tanaka et al. | |
| 2003/0007079 A1 * | 1/2003 | Sisselman ................. | 348/231.99 |
| 2004/0008253 A1 | 1/2004 | Monroe | |
| 2005/0206771 A1 * | 9/2005 | Lin .......................... | 348/333.05 |
| 2005/0243190 A1 * | 11/2005 | Ogikubo .................. | 348/231.99 |
| 2006/0050997 A1 | 3/2006 | Imamura | |
| 2006/0132636 A1 * | 6/2006 | Miyata ..................... | 348/333.01 |
| 2006/0238620 A1 * | 10/2006 | Asada et al. ............. | 348/207.99 |
| 2006/0251415 A1 | 11/2006 | Shikata | |

FOREIGN PATENT DOCUMENTS

| | | |
|---|---|---|
| CN | 1819625 A | 8/2006 |
| EP | 1 160 726 A2 | 12/2001 |
| JP | 9-83849 A | 3/1997 |
| JP | 2002-165174 A | 6/2002 |

(Continued)

OTHER PUBLICATIONS

International Search Report and Written Opinion of the International Searching Authority for PCT/JP2007/069407, dated Dec. 3, 2007. 12 Sheets.

(Continued)

*Primary Examiner* — Sinh Tran
*Assistant Examiner* — Dwight C Tejano
(74) *Attorney, Agent, or Firm* — Holtz, Holtz, Goodman & Chick, PC

(57) ABSTRACT

An image apparatus records images of a subject corresponding to a photo opportunity without intensifying complex operations after the imaging. When a SLOW button is depressed, a process is started in which frame image data that is obtained at an imaging frame rate is stored sequentially in a buffer memory. The frame image data is read out from the buffer memory at a display frame rate that is set in advance, and images are displayed on a display device based on this frame image data. When a shutter key is depressed, the frame image data read out from the buffer memory is recorded to storage memory.

36 Claims, 16 Drawing Sheets

FOREIGN PATENT DOCUMENTS

| | | |
|---|---|---|
| JP | 2004-179823 A | 6/2004 |
| JP | 2004-220679 A | 8/2004 |
| JP | 2006-080809 A | 3/2006 |
| JP | 2006-140936 A | 6/2006 |
| JP | 2006-174188 A | 6/2006 |
| JP | 2006-180471 A | 7/2006 |
| TW | 432862 B | 5/2001 |
| WO | WO 2005/055585 A1 | 6/2005 |

OTHER PUBLICATIONS

Casio: "EX-Z1000—Mode d'emploi", www.exlim.com, Sep. 17, 2006, XP002459410.

Japanese Office Action dated Oct. 15, 2009 and English translation thereof issued in a counterpart Japanese Application No. 2006-332488.

Chinese Office Action dated Jan. 6, 2011 (and English translation thereof) in counterpart Chinese Application No. 200780001433.7.

Japanese Office Action dated Jun. 21, 2011 (and English translation thereof) in counterpart Japanese Application No. 2006-263745.

Taiwanese Office Action dated Jul. 13, 2012 (and English translation thereof) in counterpart Taiwanese Application No. 096135696.

\* cited by examiner

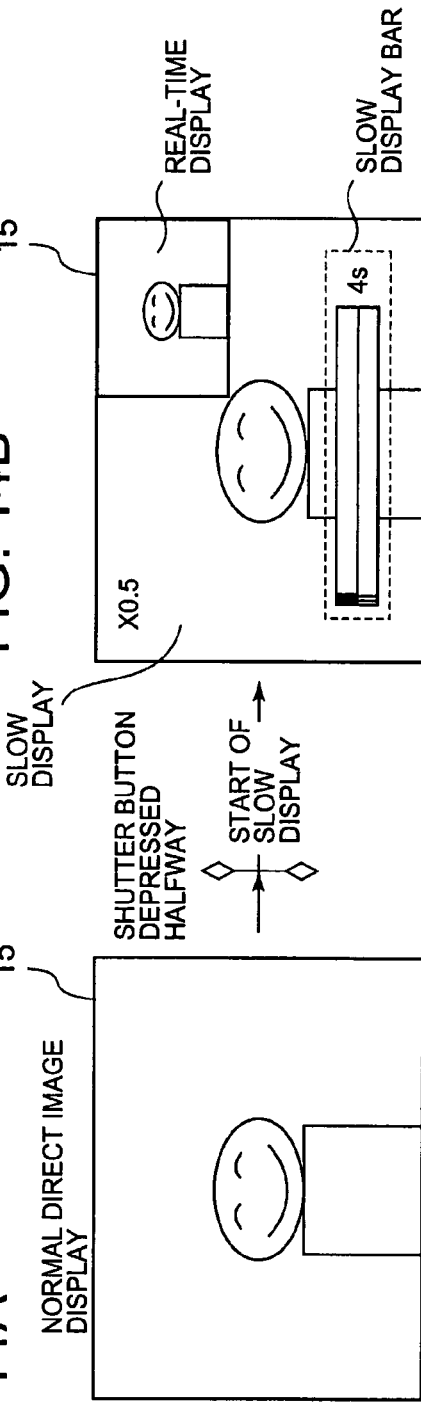
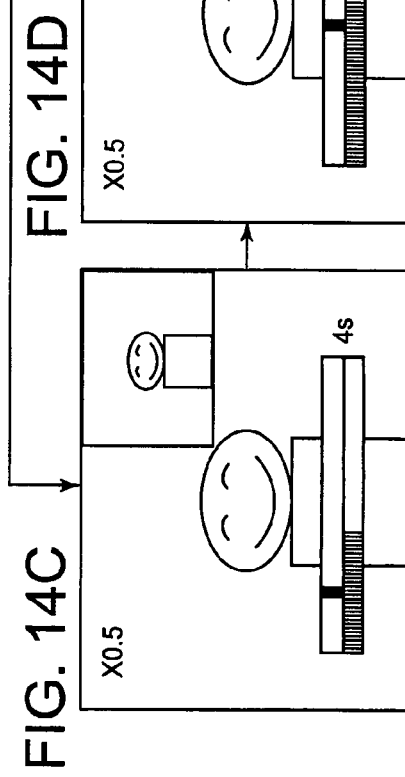

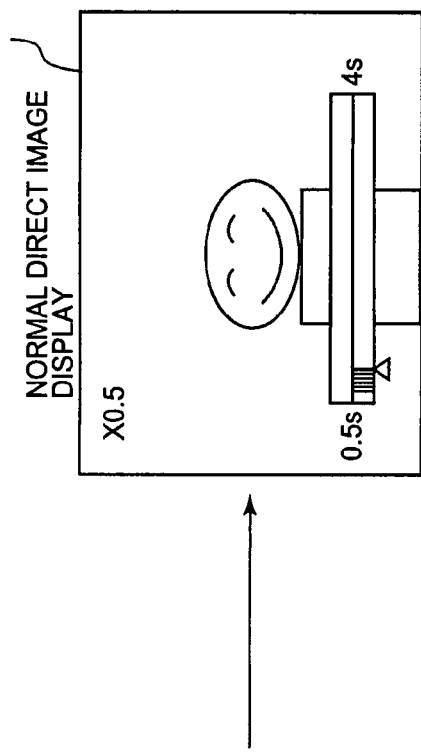
FIG. 16A
FIG. 16B
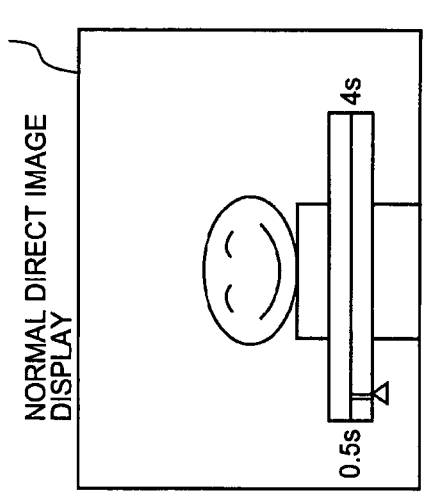
FIG. 16C
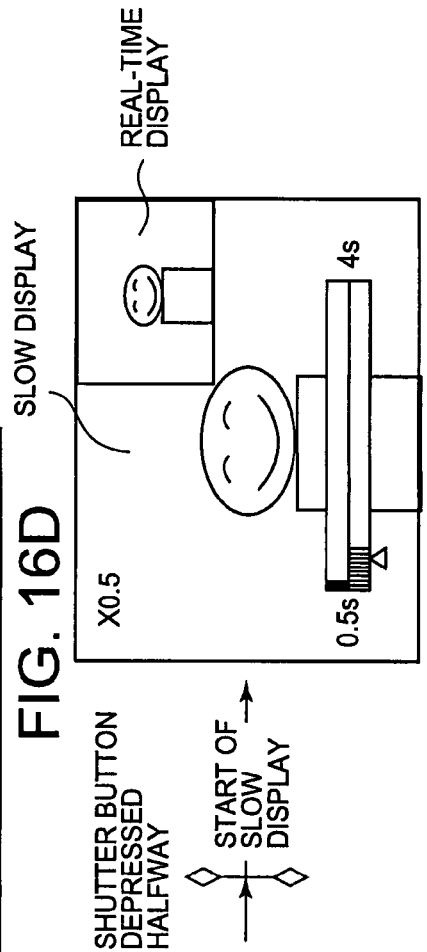
FIG. 16D

IMAGING APPARATUS, RECORDING MEDIUM FOR RECORDING A COMPUTER PROGRAM, AND IMAGING CONTROL METHOD

CROSS-REFERENCE TO RELATED APPLICATIONS

This application is based on Japanese Patent Applications No. 2006-263745 filed on Sep. 28, 2006 and No. 2006-332488 filed on Dec. 8, 2006, the entire disclosure of both of which is incorporated herein by reference in its entirety.

BACKGROUND OF THE INVENTION

1. Field of the Invention

The present invention relates to an imaging apparatus for imaging a subject and recording the image of the subject, a recording medium for recording a computer program capable of performing imaging operations, and an imaging control method.

2. Description of the Related Art

Conventionally, there are known imaging apparatus capable of preventing missed photo opportunities, such as disclosed in Unexamined Japanese Patent Application KOKAI Publication No. H09-83849. In this apparatus, when a shutter key is operated, an image from a time prior to the operation of the shutter key, i.e., captured in advance, an image captured at the time of the operation of the shutter key, and an image captured after the operation of the shutter key are all recorded onto a recording medium. This enables recording of the image of the subject at a desired photo opportunity, even if the timing of the operation of the shutter key is shifted from the photo opportunity desired by the user when the user has operated the shutter key while observing a direct image displayed on a screen or a finder of the imaging apparatus.

SUMMARY OF THE INVENTION

When images of the subject are recorded onto the recording medium at, before, and after the time of the operation of the shutter key by the user for the photo opportunity, images other than those of the actual photo opportunity will unavoidably be included. Consequently, this intensifies the cumbersome and complex operations for deleting images other than the image at the photo opportunity that are read out from the recording medium and displayed on a display screen, or the like, after the user has shot the image.

An object of the present invention is therefore to provide an imaging apparatus, a recording medium for recording a computer program capable of performing imaging operations, and an imaging control method which record an image of a subject at a photo opportunity without increasing the cumbersome and complex operations after the image has been shot or obtained.

According to one aspect of the invention, an imaging apparatus includes: imaging units for capturing sequential images of a subject according to a predetermined imaging frame rate and for outputting image data; a display unit for displaying image data; a slow display control unit for executing a slow display process for displaying, on the display unit and at a display frame rate that is lower than the imaging frame rate, the image data outputted from the imaging units at the imaging frame rate; a recording unit for recording image data; and a recording control unit that records, onto the recording unit, image data corresponding to the image of the subject displayed on the display unit in response to a first recording instruction operation in a state where the slow display control unit is executing the slow display process.

According to another aspect of the invention, recording medium includes an imaging control program for enabling a computer having an imaging device including a display unit and imaging units for capturing sequential images of a subject according to a predetermined imaging frame rate and for outputting image data, to perform: a slow display control function for executing a slow display process for displaying on the display unit and at a display frame rate that is lower than the imaging frame rate, the image data outputted at the imaging frame rate by the imaging units; a recording function for recording image data; and a recording controlling function to record in the recording function image data corresponding to the image of the subject displayed on the display unit, in response to a recording instruction operation performed while the slow display controlling function is executing the slow display process.

According to a further aspect of the invention, an imaging control method includes: an imaging step for capturing sequential images of a subject according to a predetermined imaging frame rate and for outputting image data; a slow display control step for executing a slow display process for displaying the output image data on a display unit at a display frame rate that is lower than the imaging frame rate; and a recording control step for recording, onto a recording unit, image data corresponding to the image of the subject displayed on the display unit in response to a recording instruction operation performed during slow display process.

BRIEF DESCRIPTION OF THE DRAWINGS

These objects and other objects and advantages of the present invention will become more apparent upon reading of the following detailed description and the accompanying drawings.

FIGS. 14A, 14B, 14C, 14d and 14E illustrate timing charts for showing the image being displayed on the display device;

FIGS. 16A, 16B, 16C and 16D illustrate timing charts for showing an image being displayed on the display device.

DETAILED DESCRIPTION

First Embodiment

A first embodiment of the present invention will be described below with reference to FIGS. 1-3.

Figure 1:
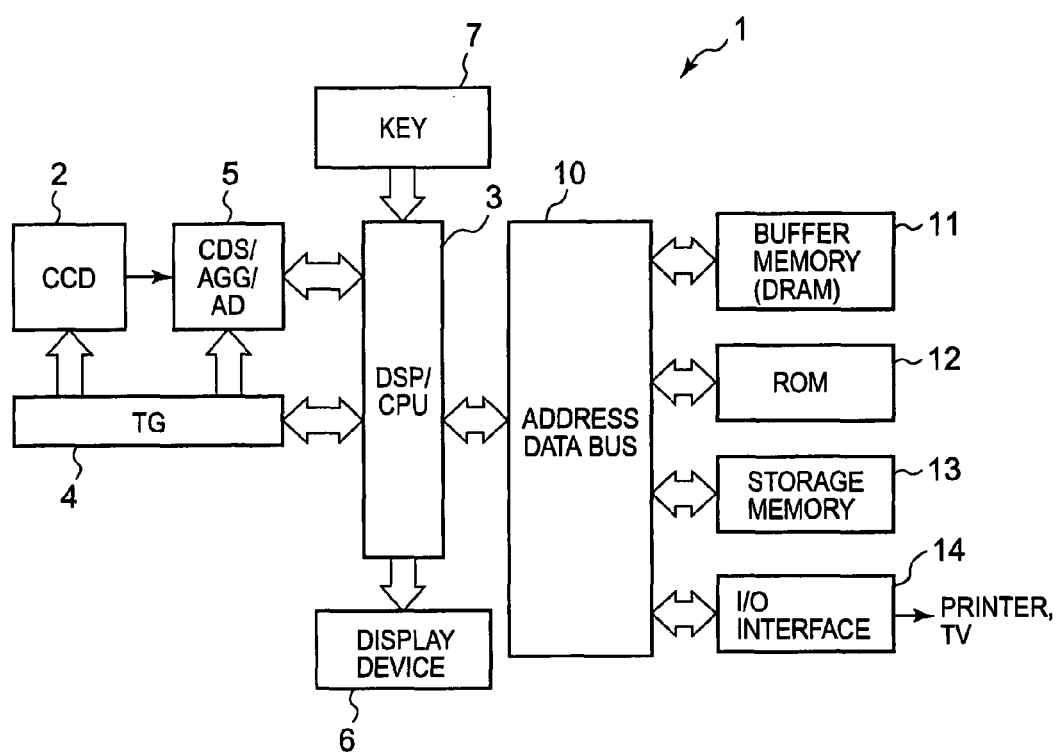
FIG. 1 is a block diagram of a digital camera in accordance with the present invention.

FIG. 1 is a block diagram illustrating a circuit structure of a digital camera 1, which is the same in each of the embodiments of the present invention. The digital camera 1 includes a still imaging function and a video (motion picture) imaging function. The digital camera 1 includes a CCD 2 and a DSP/CPU 3. The CCD 2 is provided with a Bayer array primary color filter at a photosensitive portion. The DSP/CPU 3 is a single-chip microcontroller that has various digital signal processing functions, including image data compression/decompression processes, and also controls the various units of the digital camera 1.

A timing generator (TG) 4 is connected to the DSP/CPU 3. The TG 4 drives the CCD 2 at a set frame rate, such as 60 f/s. The DSP/CPU 3 sets a charge accumulation interval based on the frame rate. This charge accumulation interval is provided to the CCD 2 through the TG 4 as a shutter pulse. The CCD 2 operating according to this shutter pulse controls the charge accumulation interval, i.e., the exposure time. The CCD 2 functions as an electronic shutter.

A unit circuit 5 is connected to the TG 4 and inputs an analog image capture signal according to an optical image of a subject outputted from the CCD 2. The unit circuit 5 includes a correlated double sampling circuit (CDS circuit) that reduces the operating noise of the CCD 2 included in the imaging signal being outputted from the CCD 2, an automatic gain control circuit (AGC circuit) that adjusts the gain of the signal after noise reduction, and an A/D converter that converts the signal after gain control into a digital signal. The unit circuit 5 converts the analog imaging signal, inputted from the CCD 2 into a digital image signal and sends digitized Bayer data to the DSP/CPU 3.

A display device 6 and a key input unit 7 are connected to the DSP/CPU 3. A buffer memory (DRAM) 11 and ROM 12, a storage memory 13, and an I/O interface 14 are also connected to the DSP/CPU 3 through an address data bus 10. The buffer memory 1 is a buffer for temporarily storing the Bayer data, etc., and is also used as a working memory, etc., for the DSP/CPU 3.

The DSP/CPU 3 first performs a pedestal clamp process, and the like, on the Bayer data that is sent from the unit circuit 5, and then converts the data into RGB data, and finally converts the RGB data into a luminance (Y) signal and color-difference (UV) signals (YUV data). One frame of this YUV data is stored in the buffer memory 11. When direct imaging, the one frame of YUV data that is stored in the buffer memory 11 is sent to the display device 6, and after conversion thereof into a video (motion picture) signal, is displayed as a direct image (through image).

When the digital camera 1 detects the operation of the shutter key by the user when in still imaging mode, an imaging process A, which is executed in the first embodiment, and an imaging process B, which is executed in the second embodiment, described below, are performed selectively. In imaging process A, when the shutter key is depressed, the digital camera 1 uses the DSP/CPU 3 to compress and encode, using the JPEG method, or the like, one frame of image data (YUV data) stored in the buffer memory 11, and after filing in the buffer memory 11, stores the encoded data in the storage memory 13. In imaging process B, when the digital camera 1 detects depression of the shutter key, a still imaging process is performed by changing the still imaging drive method and drive timing of the CCD 2 and the unit circuit 5 to be different than that which is used in direct imaging. Next, the digital camera 1 stores one frame of YUV data into the buffer memory 11 using a still imaging process. The digital camera 1 uses the DSP/CPU 3 to perform data compression and encoding, using the JPEG method, or the like, on one frame of YUV data that has been stored, and then files the result in the buffer memory 11. Thereafter, the digital camera 1 stores the result as still image data (a still image file) in the storage memory 13 through the address data bus 10.

Furthermore, in the video (motion picture) imaging mode, when the video (motion picture) imaging start instruction is detected through a first shutter key operation by the user, the digital camera 1 starts the video (motion picture) processing and stores multiple frames of YUV data in the buffer memory 11 until the video (motion picture) imaging end instruction is detected through a second shutter key operation. The multiple frames of YUV data stored in the buffer memory 11 are sent sequentially to the DSP/CPU 3, and the data is compressed and encoded through predetermined MPEG coding. Next, the encoded YUV data is written as frame data, via the buffer memory 11 and the address data bus 10, to the storage memory 13, with an added filename. When the still image or video (motion picture) image is read out, the DSP/CPU 3 decompresses the still image or video (motion picture) image data that is read out from the storage memory 13, and deploys the data, as still image data or video (motion picture) frame data, in the image data operating area of the buffer memory 11.

The display device 6 includes a color LCD and driving circuitry thereof. When in an imaging standby mode, the display device 6 displays a direct image (through image) of the subject imaged by the CCD 2, and when a recorded image is to be displayed, the display device 6 displays the recorded image read out from the storage memory 13 and decompressed.

The key input unit 7 includes a plurality of operating keys, such as a shutter key, a mode setting key, a SLOW button, a power supply key, and the like.

The key input unit 7 outputs a key input signal to the DSP/CPU 3 depending on the operation of keys by the user.

The various programs in the flowcharts, described below, and the various programs required for the functions of the digital camera, are stored in the ROM 12.

The digital camera 1 can also be connected to an external device, such as a printer, a PC, a TV receiver, or the like (not shown), through the I/O interface 14.

Figure 2:
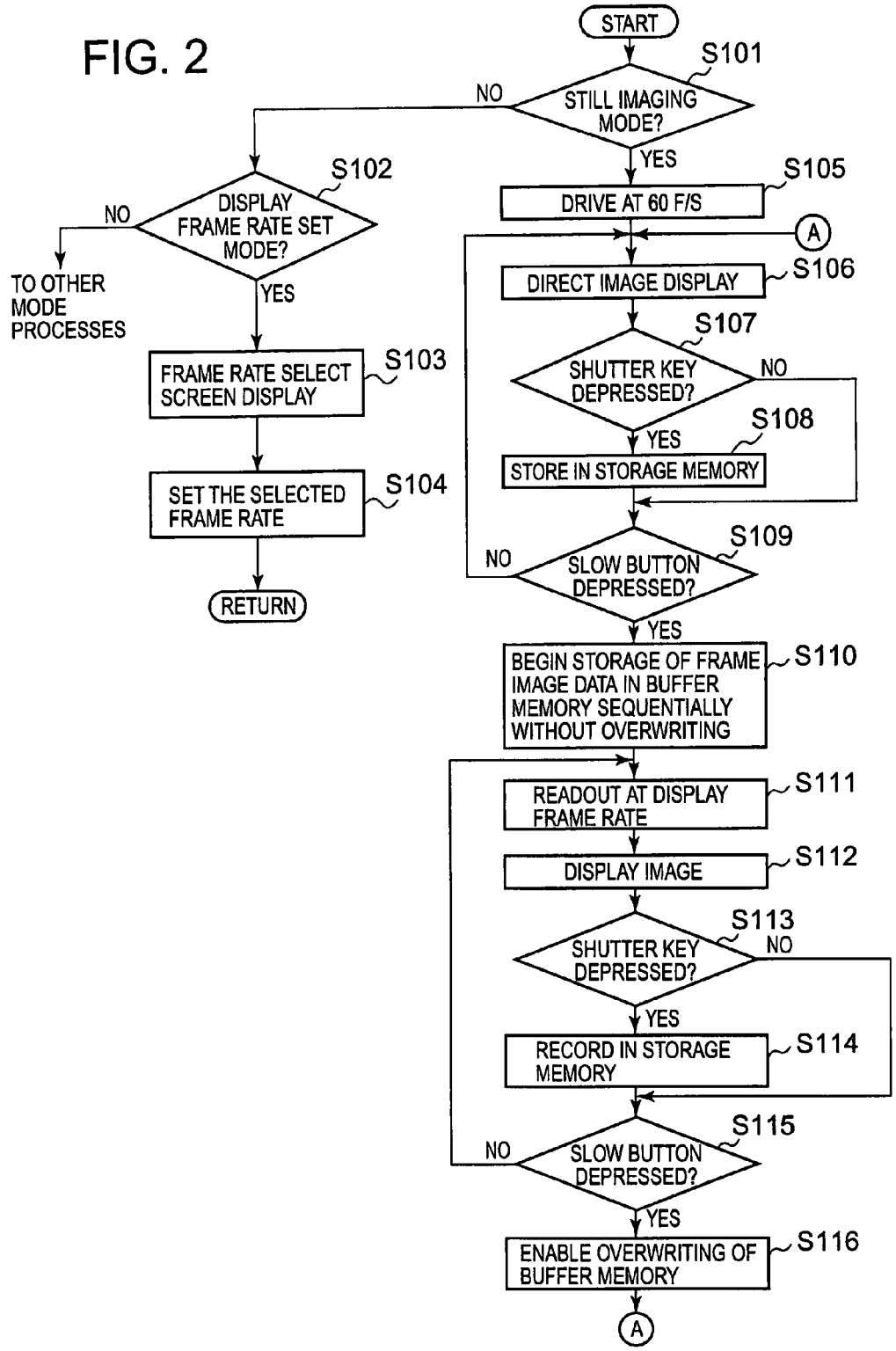
FIG. 2 is a flow chart illustrating the processing sequence in a first embodiment of the present invention.

FIG. 2 is a flow chart illustrating the processing sequence (imaging process A) in accordance with the first embodiment of the invention. When the power supply is turned ON using the power supply key of the key input unit 7, the process shown in FIG. 2 is performed following a program that is stored in the ROM 12. Specifically, the DSP/CPU 3 determines whether the still imaging mode has been set via the mode setting keys that are provided in the key input unit 7 (Step S101). If the still imaging mode is not set (S101: NO), the DSP/CPU 3 determines whether the display frame rate setting mode has been set (Step S102). If the display frame rate setting mode has not been set (S102: NO), then the DSP/CPU 3 jumps to other mode processes.

If the display frame rate setting mode has been set (S102: YES), then the DSP/CPU 3 displays, on the display device 6, a screen for selecting a frame rate, which is a screen displaying multiple frame rates that are lower than 60 f/s, which is the imaging frame rate in the presently described embodiment, as described below (Step S103). Then the DSP/CPU 3 sets, as the display frame rate, whatever frame rate is selected via the key input unit 7 from the frame rate selecting screen, and stores this display frame rate in the buffer memory 11 (Step S104).

If the result of the determination in Step S101 is that the still imaging mode is set (S101: YES), then the DSP/CPU 3 controls the TG 4 to drive the CCD 2 at 60 f/s, which is the imaging frame rate in the presently described embodiment (Step S105). The DSP/CPU 3 displays a direct image, in substantially real-time, on the display device 6, based on the frame image data obtained at this frame rate (Step S106). Only a single frame of image data is recorded in the buffer memory 11. Moreover, the frame image data that is obtained sequentially at this frame rate is sequentially updated (overwritten) in the buffer memory 11, where the updated image data in the buffer memory 11 is immediately displayed sequentially as a direct image on the display device 6. Next, the DSP/CPU 3 determines whether the shutter key has been depressed (Step S107). If the shutter key has not been depressed (S107: NO), then the DSP/CPU 3 determines whether the SLOW button has been depressed (Step S109). If the SLOW button has also not been depressed (S109: NO), then the DSP/CPU 3 returns the processing to Step S106.

Figure 3:
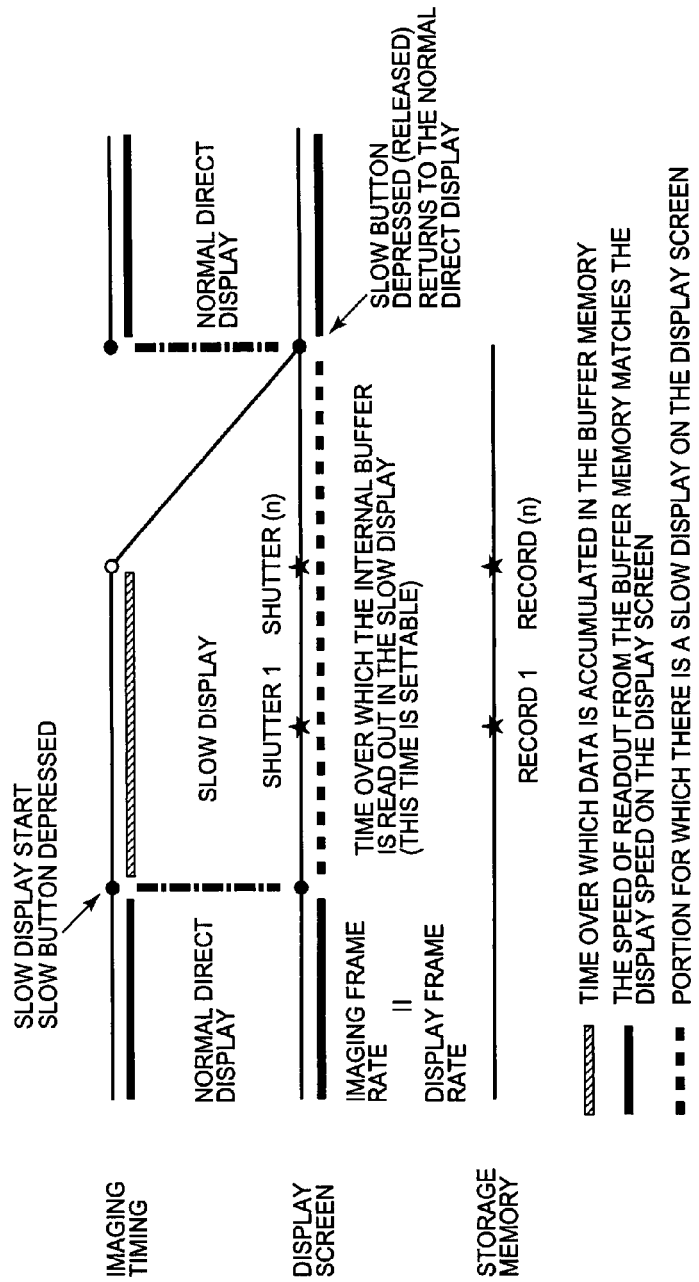
FIG. 3 is an explanatory diagram illustrating the operation of the first embodiment of the present invention.

If the shutter key and the SLOW button have not been depressed, then a loop comprising S106→S107→S109→S106 is performed repetitively, and, as shown in FIG. 3, the imaging frame rate will be equal to the display frame rate so that a direct image, which changes at the imaging frame rate, will be displayed on the display screen of the display device 6. If, when in this state, the shutter key is depressed (S107: YES), then the DSP/CPU 3 advances processing to Step S108. At this time, the DSP/CPU 3 uses the JPEG method, or the like, to perform data compression followed by encoding on the one frame of data that is stored in the buffer memory 11 (and displayed on the display device 6) when the shutter key is depressed, files the result in the buffer memory 11, and then stores the result in the storage memory 13 (Step S108). The digital camera 1 of this embodiment is therefore capable of functioning as a normal digital camera to perform normal imaging until the SLOW button is depressed.

If the user decides that it would be difficult to depress the shutter key at the photo opportunity, due to the reaction speed capabilities of the user, when viewing the direct image for which the display is changed by the process in Step S106, or if the user decides that it would be difficult to depress the shutter key at the photo opportunity because the subject is moving fast, the user depresses the SLOW button. This causes the determination in Step S109 to be YES. When the SLOW button is depressed (S109: YES), the DSP/CPU 3 begins the process of storing frame image data, obtained at the imaging frame rate, in the buffer memory 11 without sequentially updating (overwriting) the data (Step S110). As a result, as shown in FIG. 3, multiple frames of image data, obtained at the imaging frame rate (60 f/s) are sequentially stored in the buffer memory 11.

Next, the DSP/CPU 3 selects and reads out from this buffer memory 11, the frame image data, in the same sequence as which the data was shot, at the display frame rate set in Step S104 (Step S1). The DSP/CPU 3 displays, on the display device 6, images based on the frame image data that is read out (Step S112). The DSP/CPU 3 performs a process to erase (delete) from all of the plurality of frame image data stored in the buffer memory 11, the frame image data that has already been displayed on the display device 6, and performs a process to enable updating (overwriting) of the memory. Following this, the DSP/CPU 3 determines whether the shutter key has been depressed again (Step S113). If the shutter key has not been depressed (S113: NO), then the DSP/CPU 3 determines whether the SLOW button has been depressed (Step S115). If the SLOW button has also not been depressed (S15: NO), then the DSP/CPU 3 returns the processing to Step S111.

If the shutter key has not been depressed and the SLOW button have not been depressed again, then a loop comprising S111→S112→S113→S115→S111 is performed repetitively, so that the subject image will be displayed, on the display device 6, at the display frame rate based on the frame image data. At this time, as described above, the display frame rate is lower than the imaging frame rate so, as shown in FIG. 3, the subject image is slow-displayed on the display screen of the display device 6.

If, when in this state, the shutter button is depressed (S113: YES), the DSP/CPU 3 compresses and encodes, using the JPEG method, or the like, the frame image data that had been read out from the buffer memory 11 (that is, that is selected for display) when the shutter key was depressed, files the result in the buffer memory 11, and then saves the result in the storage memory 13 (Step S114). The recording process in step S114 is performed when the shutter key is depressed when in a state where Step S1 through Step S115 are being executed in a loop (that is, when Step S113 is YES). Consequently, as shown in FIG. 3, the various frame image data of "Record 1" through "Record (n)" are stored in the memory 13 depending on the depression of the shutter key "Shutter 1" through "Shutter (n)."

When the user depresses the SLOW button again (S115: YES), the DSP/CPU 3 performs a process to delete (erase) all of the frame image data that is stored in the buffer memory 11, or to enable the updating (overwriting) of the memory (Step S116), and processing returns to Step S106. At this time, as shown in FIG. 3, the imaging frame rate will be the same as the display frame rate, and a direct image that changes at the imaging frame rate will be displayed on the display screen of the display device 6.

Second Embodiment

Figure 4:
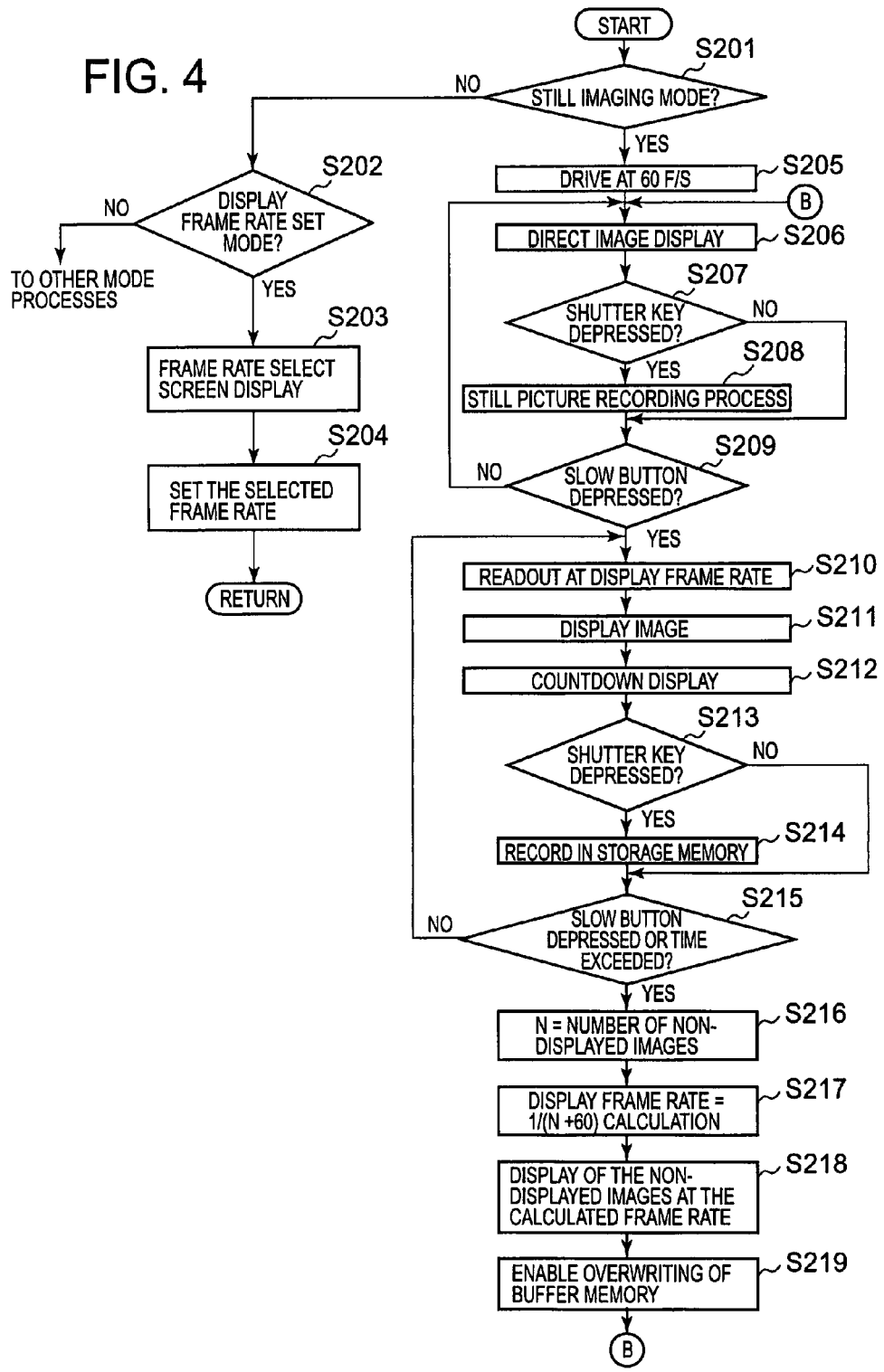
FIG. 4 is a flow chart illustrating the processing sequence in a second embodiment of the present invention.

FIG. 4 is a flow chart illustrating the processing sequence in accordance with a second embodiment (imaging process B) of the invention. When the power supply is turned ON using the power supply key of the key input unit 7, the process shown in FIG. 4 is performed following a program that is stored in the ROM 12. The DSP/CPU 3 determines whether the still imaging mode has been set via the mode setting keys that are provided in the key input unit 7 (Step S201). If the still imaging mode is not set (S201: NO), the DSP/CPU 3 determines whether the display frame rate setting mode has been set (Step S202). If the display frame rate setting mode is not set (S202: NO), then the DSP/CPU 3 advances the processing to other mode processes.

If the display frame rate setting mode has been set (S202: YES), then the DSP/CPU 3 displays, on the display device 6, a screen for selecting a display frame rate, which is a screen displaying multiple frame rates lower than the 60 f/s, which is the normal imaging frame rate in this embodiment, as described below (Step S203). Then, the DSP/CPU 3 sets, as the display frame rate, whatever frame rate is selected via the key input unit 7 from the frame rate selecting screen, and stores this display frame rate in the buffer memory 11 (Step S204).

If the result of the determination in Step S201 is that the still imaging mode is set (S201: YES), then the DSP/CPU 3 controls the TG 4 to drive the CCD 2 at 60 f/s, which is the normal imaging frame rate (Step S205). The DSP/CPU 3 displays a direct image, in substantially real-time, on the display device 6, based on the frame image data obtained at this frame rate (Step S206). Only a single frame of image data is recorded in the buffer memory 11. Moreover, the frame image data that is obtained sequentially at the frame rate is sequentially updated (overwritten) in the buffer memory 11, where the updated image data in the buffer memory 11 is immediately displayed sequentially as a direct image on the display device 6. Next, the DSP/CPU 3 determines whether the shutter key has been depressed (Step S207). If the shutter key has not been depressed (S207: NO), then the DSP/CPU 3 determines whether the SLOW button has been depressed (Step S209). If the SLOW button has also not been depressed (S209: NO), then the DSP/CPU 3 returns the processing to Step S206.

Figure 5:
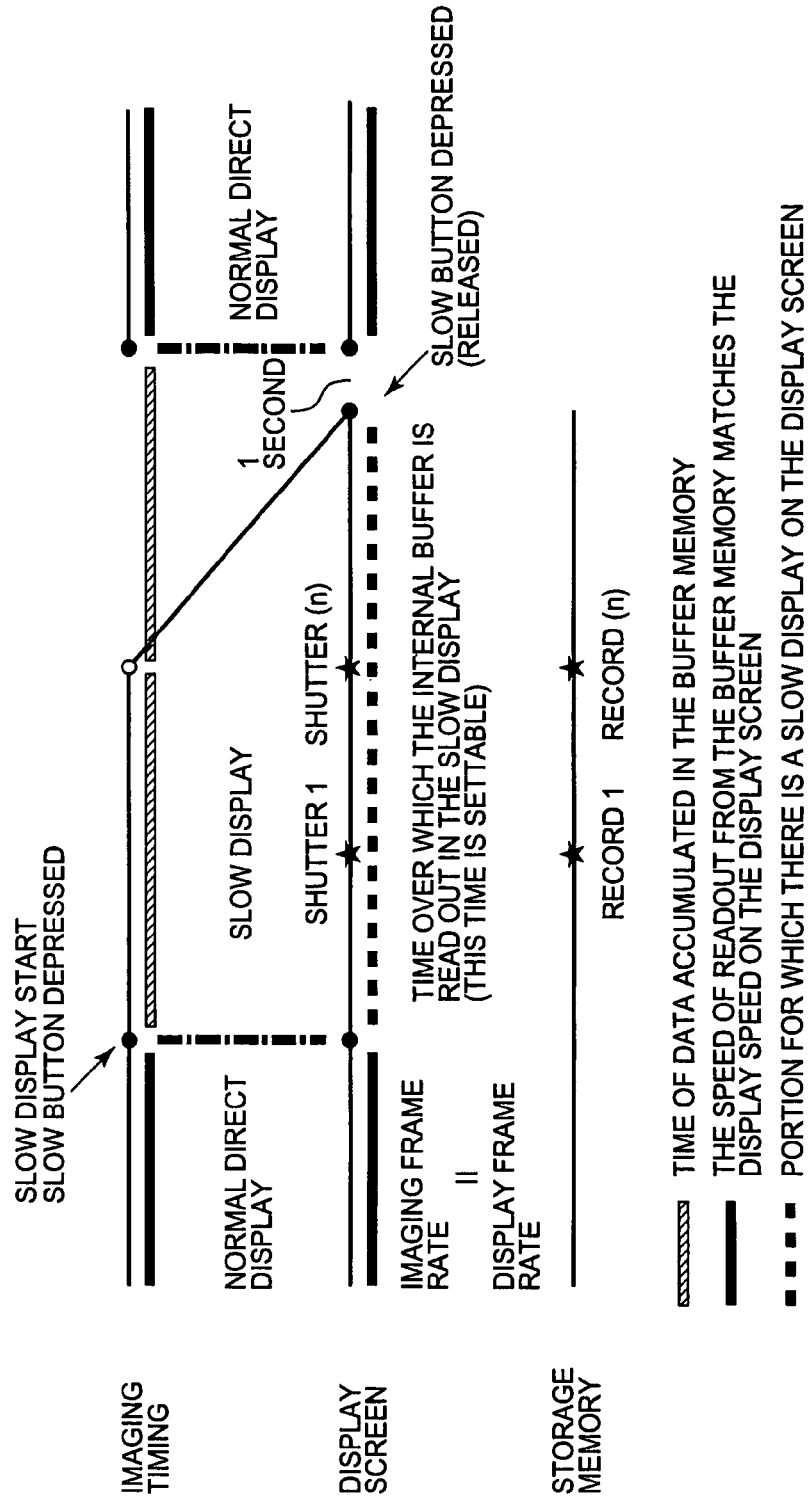
FIG. 5 is an explanatory diagram illustrating the operation of the second embodiment of the invention.

If the shutter key and the SLOW button have not been operated, then a loop comprising S206→S207→S209→S206 is performed repetitively, and, as shown in FIG. 5, the normal imaging frame rate will be equal to the display frame rate so that a direct image, which changes at the imaging frame rate, will be displayed on the display screen of the display device 6. If, when in this state, the shutter key is depressed (S207: YES), then the DSP/CPU 3 performs the still image recording process (Step S208). Thus, as described above, the digital camera 1 performs the still image recording process in order to capture a still image by switching, temporarily, the CCD 2 and the unit circuit 5 to a driving method or a driving timing for still imaging that is different from that when performing direct still imaging. Additionally, the digital camera 1 stores, in the buffer memory 11, one frame of YUV data from this still imaging, and this stored single frame of YUV data is compressed and then encoded by the DSP/CPU 3 using a JPEG method, or the like, and filed in the buffer memory 11. Thereafter, the digital camera 1 stores the filed YUV data as still image data (a still image file) in the storage memory 13 accessed through the address data bus 10.

However, if the user decides that it would be difficult to depress the shutter key at the photo opportunity, due to the reaction speed capabilities of the user, when viewing the direct image for which the display is changed by the process in Step S206, or if the user decides that it would be difficult to depress the shutter key at the photo opportunity because the subject is moving fast, the user depresses the SLOW button (S209: YES). This causes the determination in Step S209 to be YES. Consequently, when the user depresses the SLOW button (S209: YES), the DSP/CPU 3 selects, from this buffer memory 11, the frame image data to display, in the same sequence as that with which the data was shot, at the display frame rate set in Step 204, and reads out that frame image data (Step S210). The DSP/CPU 3 displays, on the display device 6, images based on the frame image data that is read out (Step S211). The DSP/CPU 3 performs a process to erase (delete), from all of the plurality of frame image data stored in the buffer memory 11, the frame image data that has already been displayed on the display device 6, and performs a process to enable updating (overwriting) of the memory.

The DSP/CPU 3 continues to perform a countdown display process (Step S212). Specifically, the DSP/CPU 3 will display the frame image data at the display frame rate and in a slow display for only a predetermined time of 30 seconds, and at the point that 30 seconds has elapsed, the slow display will be forced to terminate. As a result, the DSP/CPU 3 will display the initial value of "30 seconds" in Step S212, and with each second that elapses thereafter, a countdown display process will be performed, to provide a warning display of the remaining time for the slow display.

The slow display time (30 seconds) may be set as desired by the user during setup operations, or, alternatively, may be set through a calculation based on a display frame rate that has been set. Moreover, the digital camera 1 may perform a warning display at a point wherein the remaining time has reached 10 seconds, or may begin the countdown display at the point in time where the remaining time has reached 10 seconds.

Following this, the DSP/CPU 3 determines whether the shutter key has been depressed (Step S213). If the shutter key has not been depressed (S213: NO), then the DSP/CPU 3 determines whether the SLOW button has been depressed again and whether the slow display time has expired (Step S215). If the SLOW button has not been depressed and the time has not expired (S215: NO), then the DSP/CPU 3 returns the processing to Step S210.

If the shutter key and the SLOW button have not been depressed, then a loop comprising S210→S211→S212→S215→S210 is performed repetitively, so that the subject image based on the frame image data will be displayed, on the display device 6, at the display frame rate. At this time, as described above, the display frame rate is lower than the imaging frame rate, so, as shown in FIG. 5, the subject image is slow displayed on the display screen of the display device 6.

If, when in this state, the shutter button is depressed (S213: YES), the DSP/CPU 3 compresses and encodes, using the JPEG method, or the like, the frame image data read out from the buffer memory 11 (i.e., the frame image data selected for display) when the shutter key was depressed, files the result in the buffer memory 11, and then saves the result in the storage memory 13 (Step S214). The recording process in Step S214 is performed when the shutter key is depressed when in a state where Step S210 through Step S215 are being executed in a loop (that is, when Step S213 is YES). Consequently, as shown in FIG. 5, the various frame image data of "Record 1" through "Record (n)" are stored in the memory 13 depending on the depression of the shutter key "Shutter 1" through "Shutter (n)."

In addition, if the user has depressed the SLOW button again or the time has expired (S215: YES), then the DSP/CPU 3 retrieves and outputs the number of undisplayed images N that remain undisplayed in the frame image data stored in the buffer memory 11 in Step S211 (Step S216). Following this, the DSP/CPU 3 uses this detected N to calculate a display rate of $1/(N+60)$ (Step S217). Moreover, the DSP/CPU 3 displays, on the display device 6, the remaining undisplayed image data at this calculated display frame rate of $1/N$.

In this embodiment, the display time of the undisplayed image data (N) is fixed and set to 1 second, and the digital camera 1 displays all of the undisplayed images within that 1 second (where these undisplayed images include the images that have continued to be accumulated, at the imaging frame rate, in the buffer memory 11 after the depression of the SLOW button was detected in Step S216). The user may be allowed to set a display time for these undisplayed images. Additionally, the user may be allowed to selectively set a display frame rate for the undisplayed images. In this case, the display time for the undisplayed images would change in accordance with the number of undisplayed images and the display frame rate for the undisplayed images, set selectively by the user, and, additionally, there would be a requirement that the display frame rate for the undisplayed images be at least higher than the imaging frame rate, or, in other words, a rate that is substantially higher than the display frame rate set in Step S204. Additionally, a constant rate, determined in advance, may be used as the display frame rate for the undisplayed images. In this case, the display time for the undisplayed images would vary depending on the number of undisplayed images.

Following this, in Step S219, the DSP/CPU 3 performs a process to erase (delete) all of the frame image data that is stored in the buffer memory 11, or a process to allow the updating (or overwriting) of memory, and processing returns to Step S206. Consequently, as shown in FIG. 5, after one second, the imaging frame rate will again return to be the same as the display frame rate, and a direct image that changes at the imaging frame rate will be displayed on the display screen of the display device 6.

In the embodiment described above, the display frame rate could be set by a user selecting the frame rate from a screen displaying a plurality of frame rates. Alternatively, the manufacturer may set a constant low display frame rate that is appropriate for the slow display, and read out may be from the buffer memory 11 at this display frame rate. Additionally, while in this embodiment the beginning and ending of the slow display is in response to identical slow button operations, alternatively it may be in response to different operations. Moreover, although in the present embodiment, the beginning and ending of the slow display is in response to the SLOW button operation, in alternative embodiments, a shutter key that is capable of a half-depressed (first-stage depressing) operation and a full-depressed (second-stage depressing) operation can be used, and the slow display may be started when a half-depressed operation of the shutter key is detected and the slow display may be ended when a full-depressed operation of the shutter key is detected.

Third Embodiment

In the digital camera 1 in the first and second embodiments of the invention described above, the slow image was displayed so as to transition to the direct image. In the digital camera 1 in a third embodiment of the invention, the slow image and the real-time image (direct image) may be displayed simultaneously. Moreover, the digital camera 1 may be constructed and arranged such that imaging may be performed on the slow image and on the real-time image.

The imaging device of the third embodiment of the invention may be embodied using the digital camera 1 having the same structure as shown in FIG. 1.

However, the key input unit 7 in the digital camera 1 in the third embodiment is provided with a plurality of operating keys such as a shutter button that can be operated in two stages (half-depressed and full-depressed), an imaging instruction button, a mode setting key, a menu key, a + key, a SET key, and the like.

The operation of the digital camera 1 in the third embodiment will be explained with reference to FIGS. 6 and 7.

When the still imaging mode is set by the user via the mode setting key in the key input unit 7, the DSP/CPU 3 begins a video imaging process that shoots a video of the subject at a predetermined frame rate (for example, 60 f/s) in the CCD 2 by means of the TG 4 (Step S301).

Next, the DSP/CPU 3 starts the direct image display (the normal direct image display), which displays in real-time, on the display device 6, the frame image data obtained sequentially by the video imaging process (Step S302). This normal direct image display refers to displaying, on a single screen, the image data imaged by the CCD 2.

The luminance and color-difference signals that are imaged sequentially by the CCD 2 and generated sequentially by the unit circuit 5 are stored in the buffer memory 11, and the stored frame image data is displayed on the display device 6. More specifically, only one frame of frame image data is stored in the buffer memory 11, and the frame image data imaged at the frame rate is updated (overwritten) in the buffer memory 11, and the updated frame image data in the buffer memory 11 is immediately displayed sequentially as the direct image on the display device 6.

When the direct image display is started, the DSP/CPU 3 determines whether the shutter button has undergone a half-depressed operation (Step S303). This determination is made based on whether an operating signal caused by the half-depressed operation of the shutter button has been sent from the key input unit 7.

If it is determined that the shutter button has not been half-depressed (S303: NO), then the DSP/CPU 3 determines whether to change the setting for the continuous shooting speed (Step S304).

This continuous shooting speed is the speed (imaging interval) for imaging continuously by the continuous shooting imaging process described below, where the faster the speed, the more number of images that are shot per second (the shorter the imaging interval). The continuous shooting speed can be set to a speed of no more than, for example, 60 images per second (a continuous shooting speed enabling 60 images to be shot continuously in one second).

If the user wants to change the setting for the continuous shooting speed, the user may operate the menu keys to change the setting for the continuous shooting speed, and the DSP/CPU 3 will determine that the setting for the continuous shooting speed has been changed when an operating signal corresponding to the operation that changes the setting for the continuous shooting speed has been sent from the key input unit 7.

If it is determined that the setting for the continuous shooting speed has been changed by the user (S304: YES), then the DSP/CPU 3 changes the setting for the continuous shooting speed in accordance with the user operations (Step S305), and advances the processing to Step S306. If it is determined that there is no change to the setting for the continuous shooting speed (S304: NO), then the DSP/CPU 3 advances the processing to Step S306 without taking any other action. This continuous shooting speed for which the setting has been changed is stored in the buffer memory 11 by overwriting the continuous shooting speed storage area.

The DSP/CPU 3 determines whether to change the setting for the continuous shooting time (Step S306). This continuous shooting time refers to the time over which imaging is performed continuously by the continuous shooting imaging process, described below.

If the user wants to change the setting for the continuous shooting time, the user may operate the menu keys to change the setting for the continuous shooting time, and the DSP/CPU 3 will determine that the setting for the continuous shooting time has been changed when an operating signal corresponding to the operation that changes the setting for the continuous shooting time has been sent from the key input unit 7.

If it is determined that the setting for the continuous shooting time is to be changed (S306: YES), then the DSP/CPU 3 changes the setting for the continuous shooting time in accordance with the user operations (Step S307), and advances the processing to Step S308.

If it is determined that there is no change to the setting for the continuous shooting time (S306: NO), then the DSP/CPU 3 advances the processing to Step S308 without taking any other action. This continuous shooting time for which the setting has been changed is stored in the buffer memory 11 by overwriting the continuous shooting time storage area.

The DSP/CPU 3 then determines whether to change the setting for the slow display speed (Step S308).

This slow display speed refers to the display interval over which there is a display through the slow display, described below, wherein the faster the speed, the shorter the display interval (the higher the display frame rate), and the slower the speed, the longer the display interval (the lower the display frame rate). The display speed can be set to a display speed of less than, for example, 1× as the slow display speed. The notation 1× refers to real-time display, the speed of display by the normal direct image display. For example, for the case of imaging at 60 frames per second, displaying at 60 frames per second corresponds to the display speed being 1×, and when imaging at 30 frames per second, displaying at 30 frames per second corresponds the display speed being 1×. The display speed will thus vary depending on the imaging interval of the image data that has been imaged.

The slow display speed may instead be set in terms of frames per second (how many times the image is overwritten per second). The display speed that is set cannot be faster than the continuous shooting speed (that is, the number of times per second which an image is displayed cannot be more than the number of times per second which imaging is performed depending on the continuous shooting speed).

If the user wants to change the setting for the slow display speed, the user may operate the menu keys to change the setting for the slow display speed, and the DSP/CPU 3 will determine that the setting for the slow display speed has been changed when an operating signal corresponding to the operation that changes the setting for the slow display speed has been sent from the key input unit 7.

If it is determined that the setting for the slow display speed is to be changed (S308: YES), then the DSP/CPU 3 changes the setting for the slow display speed in accordance with the user operations (Step S309), and returns the processing to Step S303.

If it is determined that there is no change to the setting for the slow display speed (S308: NO), then the DSP/CPU 3 returns the processing to Step S303 without taking any other action.

The data indicating the slow display speed for which the setting has been changed is stored in the buffer memory 11 by overwriting the slow display speed storage area.

If it is determined in Step S303 that the shutter button has been depressed halfway, i.e., half-depressed (S303: YES), then the DSP/CPU 3 advances processing to Step S310 in FIG. 7, and begins the continuous shooting imaging process that images the subject continuously at the continuous shooting speed that is stored in the continuous shooting speed storage area (the continuous shooting speed for which the setting was changed in Step S305) (Step S310). At this time, the DSP/CPU 3 starts a timer.

Next, the DSP/CPU 3 starts a process that stores in the buffer memory 11, the image data imaged by the CCD 2 (including the image data obtained in the continuous shooting imaging process and the frame image data obtained by the video imaging process). The image data that has been imaged is stored in the buffer memory without updating (overwriting) of the memory, i.e., multiple image data is stored in the buffer memory.

Next, the DSP/CPU 3 starts a process that reads out the image data that has been stored in the buffer memory and displays this image data in a display area A of the display device 6 at the slow display speed that is stored in the slow display speed storage area, i.e., at the slow display speed that was set in Step S309. This causes the images to be slow displayed, enabling the photo opportunity to be found more easily, which is particularly useful for a subject that is moving quickly.

Figure 8:
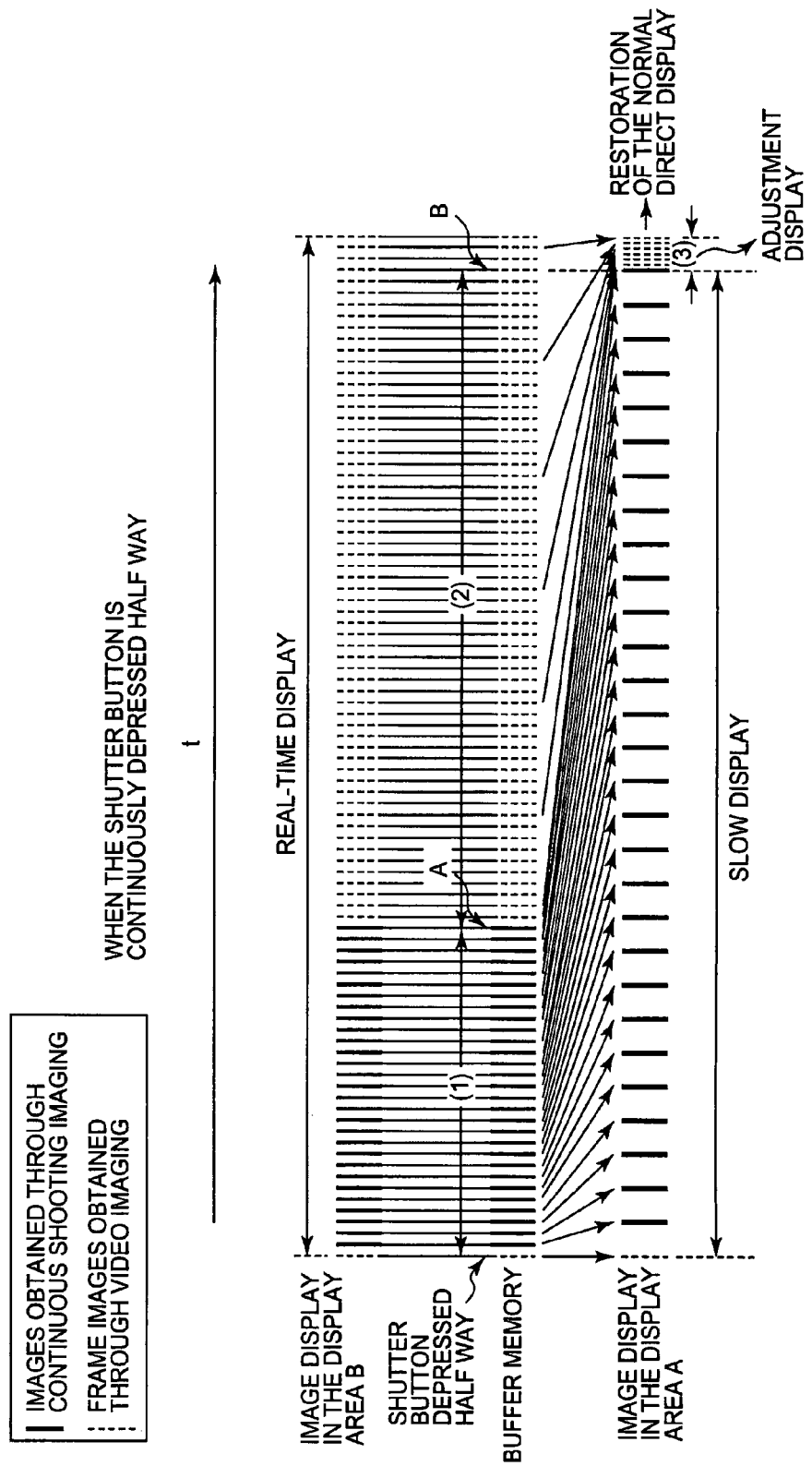
FIG. 8 is a diagram illustrating a timing chart for an image displayed in a display area A when no operation, such as releasing the half-depression of the shutter button, or fully depressing the shutter button, or the like, is performed during slow display.

FIG. 8 shows a timing chart for an image that is displayed in the display area A and an image that is displayed in a display area B when, during the slow display, there is no operation, such as releasing the half-depressed shutter button or fully depressing the shutter button (i.e., when the half-depression operation of the shutter button continues until the end of the slow display).

Figure 9:
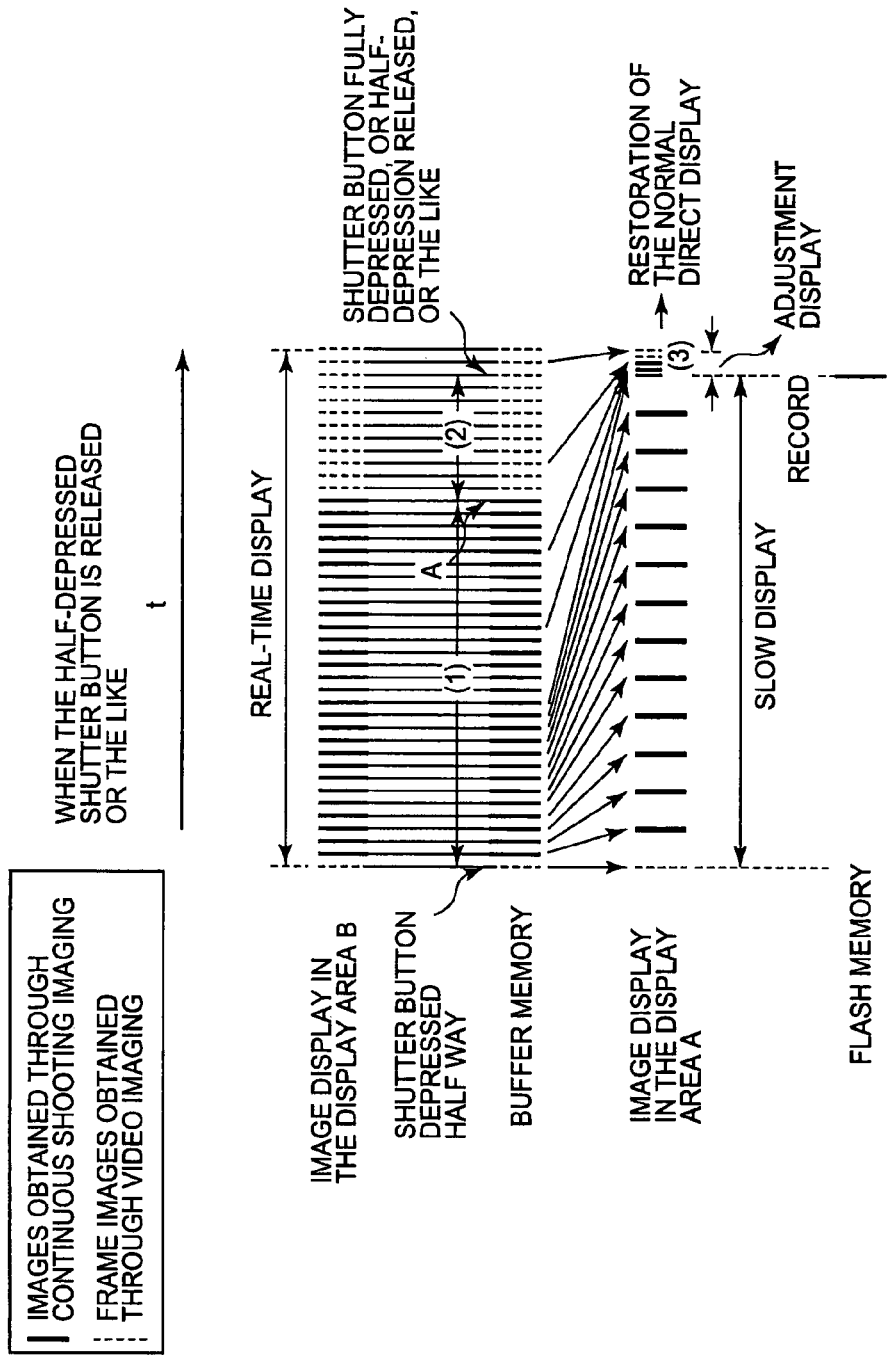
FIG. 9 is a diagram illustrating a timing chart for an image displayed in the display area A when an operation, such as releasing the half-depression of the shutter button, or fully depressing the shutter button, or the like, is performed during slow display.

FIG. 9 shows a timing chart for an image that is displayed in the display area A and an image that is displayed in the display area B when, during the slow display, there is an operation, such as releasing the half-depressed shutter button, fully depressing the shutter button, or operating the imaging instruction button (i.e., when the half-depression operation of the shutter button is released, or the like, prior to the end of the slow display).

In FIGS. 8 and 9, t indicates the time axis, the frame rate of the video imaging process is 60 f/s, and the continuous shooting imaging interval for the continuous shooting imaging process is 60 images per second.

As shown in FIGS. 8 and 9, when the shutter button is depressed half-way, the continuous shooting imaging process begins, and the image data that is imaged by the continuous shooting imaging process is stored sequentially in the buffer memory. At this time, the slow display speed of displaying in the display area A is slower than the continuous shooting speed of imaging by the continuous shooting imaging process, so it can be seen that the times of the imaging timing of the image data that is currently imaged and the times of the imaging timing of the image data that is currently displayed will gradually diverge. Reference notation "(1)" in FIGS. 8 and 9 indicates the interval over which imaging is performed in the continuous shooting imaging process, and reference notation "A" in FIGS. 8 and 9 indicates the timing of the end of the continuous shooting imaging process. This interval is not always the same as the continuous shooting interval for which the setting was changed in Step S307, but rather if, during imaging using the continuous shooting imaging process, the half-depression of the shutter button is released, the shutter button is fully depressed, or the imaging instruction button is operated, then this will be the interval from the beginning of the continuous shooting imaging process until the half-depression of the shutter button is released, the shutter button is fully depressed, the imaging instruction button is operated, or the like.

Next, the DSP/CPU 3 reads out the image data (including frame image data) that is stored in the buffer memory 11, at the same speed as the speed with which the image data was imaged (reading out in real-time), and begins the process of displaying on the display area B of the display device 6. For example, when displaying a video image imaged at 60 fps or image data imaged through continuous shooting imaging at a speed of 60 f/s, the image data would be displayed by overwriting at the same speed as the imaging speed, i.e., 60 frames per second. However, if imaged at 30 fps or at an imaging speed of 30 frames per second, the image data would be displayed by overwriting at the same speed as the imaging speed, i.e., 30 frames per second. Thus, the captured images are displayed in real-time in the display area B.

While in Step S312, the time of the imaging timing of the image data currently being imaged and the time of the imaging timing of the image data currently being displayed gradually diverge, but this divergence does not occur in the display area B because the image is being displayed in real-time, thus enabling display of the image currently being imaged, and also enabling the user to confirm the type of subject currently being imaged.

Referring back to FIG. 7, the DSP/CPU 3 determines whether to change the setting for the continuous shooting speed (Step S314).

The user can change the settings for the continuous shooting speed by operating the up arrow key or the down arrow key of the + key, and the DSP/CPU 3 will determine that the setting for the continuous shooting speed has been changed when an operating signal corresponding to that operation has been sent from the key input unit 7.

If the user wants to increase the continuous shooting speed, the user would operate the up arrow key on the + key, or if the user wants to decrease the continuous shooting speed, the user would operate the down arrow key on the + key. In this manner, the user is able to set a continuous shooting speed that is appropriate for the imaging situation when performing the actual continuous shooting imaging.

If it is determined that the setting for the continuous shooting speed is to be changed (S314: YES), then the DSP/CPU 3 temporarily changes the setting for the continuous shooting speed in accordance with these operations (Step S315), and advances the processing to Step S316.

If it is determined that there is no change to the setting for the continuous shooting speed (S314: NO), then the DSP/CPU 3 advances the processing to Step S316 without taking any other action.

This temporary change of settings refers to changing the continuous shooting speed, limited to the current continuous shooting imaging, where even when the settings for the continuous shooting speed are changed in Step S315, the continuous shooting speed for which the settings are changed is not stored in the continuous shooting speed storage area in the buffer memory 11. Consequently, in the next continuous shooting imaging, the continuous shooting process will be performed at the continuous shooting speed stored in the continuous shooting speed storage area by Step S305 in FIG. 6.

Moreover, when this temporary change of the setting for the continuous shooting speed is performed, the continuous shooting speed at which imaging is performed by the continuous shooting imaging process will be changed during the continuous shooting imaging. Thus, the continuous shooting imaging process is performed at the continuous shooting speed for which the setting has been changed.

The DSP/CPU 3 determines whether to change the setting for the slow display speed (Step S316).

The user can change the setting for the slow display speed by operating the right arrow key or the left arrow key of the + key, and the DSP/CPU 3 will determine that the setting for the slow display speed has been changed when an operating signal corresponding to that operation has been sent from the key input unit 7.

If the user wants to increase the slow display speed, the user would operate the right arrow key of the + key, or if the user wants to decrease the slow display speed, the user would operate the left arrow key of the + key. In this manner, the user is able to set a slow display speed that is appropriate for the imaging situation when performing the actual continuous shooting imaging.

If it is determined that the setting for the slow display speed is to be changed (S316: YES), then the DSP/CPU 3 temporarily changes the setting for the slow display speed in accordance with these operations (Step S317), and advances the processing to Step S318.

If it is determined that there is no change to the setting for the slow display speed (S316: NO), then the DSP/CPU 3 advances the processing to Step S318 without taking any other action.

This temporary change of settings refers to changing the slow display speed, limited to the current continuous shooting imaging, where even when the setting for the slow display speed is changed in Step S317, the data indicating slow display speed for which the settings are changed is not stored in the slow display speed storage area in the buffer memory 11. Consequently, in the next continuous shooting imaging, the continuous shooting process will be performed with the slow display speed stored in the slow display speed storage area by Step S309 in FIG. 6.

Moreover, when this temporary change of the setting for the slow display speed is performed, the slow display speed for displaying in the display area A will be changed during the slow display. The image data will be read out from the buffer memory 11 at the slow display speed for which the setting has been changed, and the image data read out will be displayed in the display area A.

Referring back to FIG. 7, the DSP/CPU 3 determines whether all of the image data obtained by the continuous shooting imaging process has been slow displayed (Step S318). Thus, a determination is made, as shown in FIG. 8, as to whether all of the display data obtained by the continuous shooting imaging process has been slow displayed. Reference notation "B" in FIG. 8 indicates the timing when all of the image data obtained by the continuous shooting imaging process has been slow displayed.

When it is determined that the slow display of the image data obtained by the continuous shooting has not been completed (Step S318), the DSP/CPU 3 determines whether the half-depression of the shutter button has been released (Step S319). Specifically, a determination is made, as shown in FIG. 9, as to whether the half-depression of the shutter button has been released prior to all of the image data obtained by the continuous shooting imaging process having been slow displayed. It may be considered that the half-depression of the shutter button has been released when the operating signal corresponding to the half-depression of the shutter button ceases to be sent from the key input unit 7 and the operating signal corresponding to the full-depression operation of the shutter button has also not been sent.

If it is determined that the shutter half-depression has not been released (S319: NO), the DSP/CPU 3 determines whether the imaging instruction button has been operated (Step S320). This determination is made based on whether an operating signal depending on the operation of the imaging instruction button has been sent from the key input unit 7.

If it is determined that the imaging instruction button has not been operated (S320: NO), the DSP/CPU 3 determines whether there has been a full-depression operation of the shutter button (Step S321). It may be considered that a full-depression operation of the shutter button has been performed when an operating signal corresponding to the full-depression of the shutter button is sent from the key input unit 7.

When it is determined that a full-depression operation of the shutter button has not been performed (S321: NO), the DSP/CPU 3 determines whether the subject is being imaged currently by the continuous shooting imaging process (Step S322). If it is determined that, at the current time, the subject is being imaged by the continuous shooting imaging process (S322: YES), then the DSP/CPU 3 determines whether the continuous shooting time, stored in the continuous shooting time storage area, has elapsed since the beginning of the continuous imaging shooting operation (Step S323). Specifically, it is determined whether or not the timer has exceeded the continuous shooting time.

If it is determined that the continuous shooting time has elapsed (S323: YES), then the DSP/CPU 3 switches from the continuous shooting imaging process to the video imaging process (Step S324), and processing returns to Step S316.

If it is determined that, at the present time, imaging is not being performed by the continuous shooting imaging process (S322: NO), i.e., if it is determined that the video imaging process is being performed, then the DSP/CPU 3 returns processing to Step S316 without taking any other action. In Step S323, if it is determined that the continuous shooting time has not elapsed (S323: NO), processing returns to Step S314 without any other action.

Reference character "A" in FIGS. 8 and 9 indicates the timing when the continuous shooting time has elapsed. From FIGS. 8 and 9, it can be seen that the subject is imaged by the continuous shooting imaging process until the timing of A has elapsed, and when the timing of A has elapsed, the imaging of the subject switches from the continuous shooting imaging process to the video imaging process. Reference character "(2)" in FIGS. 8 and 9 indicates the interval over which imaging is performed by the video imaging process during the slow display.

Referring back to FIG. 7, if it is determined in Step S321 that the shutter button has been fully depressed (S321: YES), then the DSP/CPU 3 performs a compression process on the image data currently (i.e., at a point in time that the full-depression operation is performed on the shutter button) slow displayed in the display area A of the display device 6 (i.e., the image data that is stored in the buffer memory), and stores the result in the storage memory 13 (Step S325), and processing returns to Step S327.

As shown in FIG. 9, when the shutter button has been fully depressed, the image data that has been slow displayed is stored in the storage memory 13.

If it is determined in Step S320 that the imaging instruction button has been operated (S320: YES), then the DSP/CPU 3 performs a compression process on the image data displayed in the display area B of the display device 6 (including frame image data), and stores the result in the storage memory 13 (Step S326), and processing advances to Step S327. Thus, when the imaging instruction button is operated, the image data that is currently displayed in real-time is stored.

If it is determined in Step S318 that the slow display of the image data obtained by the continuous shooting imaging has been completed, and then if it is also determined in Step S319 that the half-depression of the shutter button has been released, processing advances to Step S327 without any other action.

When processing has advanced to Step S327, a skip (frame thinning) display is performed based on the image data that is stored at that time in the buffer memory 11. Even during the time that this skip display is performed, the video imaging process or the continuous shooting imaging process continues.

Reference character "(3)" in FIG. 8 indicates the state of the image that is skip displayed when it is determined that all of the image data imaged by the continuous shooting imaging process has been slow displayed, and reference character "(3)" in FIG. 9 indicates the state of the image that is skip displayed when it is determined that the half-depression of the shutter button has been released, the shutter button has been fully depressed, or the imaging instruction button has been operated, before all of the image data imaged by the continuous shooting imaging process has been slow displayed.

In the skip display in FIG. 8, all of the image data obtained in the continuous shooting imaging process is displayed, so after the continuous shooting time has elapsed, the frame image data obtained by the video imaging process is skip displayed, where, in the skip display in FIG. 9, the image data that has not been slow displayed when the half-depression of the shutter button is released, when the shutter button is fully depressed, or when the imaging instruction button is operated, and the frame image data obtained through the video imaging process after the continuous shooting time has elapsed, is skip displayed. If the half-depression of the shutter button is released, the shutter button is fully depressed, or the imaging instruction button is operated, prior to the continuous shooting time having elapsed, only the image data obtained through the continuous shooting imaging process that has not yet been slow displayed at the point in time wherein the half-depression of the shutter button is released or the shutter button is fully depressed will be skip displayed.

The image data (including frame image data) that is imaged during this skip display will also be images subject to skip display. As such, image data imaged after the slow display has been completed, and image data imaged after the time at which the half-depression of the shutter button has been released, the shutter button has been fully depressed, or the imaging instruction button has been operated, will also be subject to skip display. One purpose of this process is to smoothly link the image data that is currently being imaged with the images displayed in the display area A, and thereby reduce the sense of discomfort of the user that is viewing the displayed images.

Although the skip display in FIGS. 8 and 9 both thin image data (including frame image data) that has not yet been displayed, and display at a speed that is greater than that of the direct image display, a simple thinned display may be performed instead. Moreover, instead of thinning, the image data that has not yet been displayed may be displayed at a high speed instead.

The load of the imaging process may be reduced, and the image data thinning process may be eliminated, by providing that the imaging frame rate for the video imaging process performed during the slow image display after the continuous shooting time has elapsed is at a frame rate at which only the frame images that are skip displayed are imaged (a frame rate that is lower than that of the continuous shooting imaging). In this case, only the image data that is required for the skip display is imaged and stored in the buffer memory 11 in advance, so all of the image data stored in the buffer memory 11 will be displayed.

Moreover, while all of the frame image data imaged by the video imaging process after the continuous shooting time elapsed was stored in the buffer memory 11 and that stored frame image data was used in performing the skip display, the frame thinning and storage may be performed at the stage wherein the frame image data that has been imaged in the video imaging process is stored in the buffer memory 11. In this case, only the image data that is already thinned is stored in the buffer memory 11, so that all of the image data stored in the buffer memory 11 will be displayed.

One reason for performing the skip display is that, as described above, the images displayed in the display area A are slow displayed, so the time for the timing of imaging of the image data currently being imaged, and the time for the timing of imaging of the image data currently displayed gradually diverge. As a result, when returning to a normal direct image display after the half-depression of the shutter button is released or after the full-depression of the shutter button, there is no continuity between the image that has been slow displayed and the image that is displayed by the normal direct display, resulting in a sense of discomfort. It is possible to create continuity with the image data that is currently being imaged, thereby providing a natural video display, by displaying the image data (including frame image data) that has not yet been slow displayed.

Referring back to FIG. 7, processing advances to Step S328, and the DSP/CPU 3 determines whether the subject is currently being imaged by the continuous shooting imaging process (Step S328).

If imaging by the continuous shooting imaging process (S328: YES), then the DSP/CPU 3 returns the processing to Step S301 (see FIG. 6).

If imaging by the video imaging process (S328: NO), then the DSP/CPU 3 returns the processing to Step S302 (see FIG. 6), and restores the normal direct image display.

This enables the display of images in real-time until the arrival of the next photo opportunity, enabling the decision as to whether a photo opportunity is about to arrive to be performed appropriately. If the slow display were to be performed even though there is no imminent photo opportunity when the shutter button is fully depressed or when the half-depression is released or the imaging instruction button is depressed when there is no imminent photo opportunity, the timing of the determination that a photo opportunity is imminent made by viewing the image that is slow displayed would be when the photo opportunity has already arrived.

Moreover, if all of the image data obtained through the continuous shooting imaging were direct displayed even if the user were to depress the shutter button after determining that a photo opportunity was imminent, then the image of the photo opportunity would not be within image data that is slow displayed, so it would not be possible for the user to determine appropriately whether the photo opportunity is again imminent by returning to the normal direct image display.

As described above, in the third embodiment of the invention, the digital camera 1 displays the slow image and the real-time image simultaneously when the shutter button is depressed half-way, so the user is able to view the subject being currently imaged and also easily find the photo opportunity image by viewing the slow display.

Moreover, the image that is displayed in real-time is recorded when the imaging instruction button is operated, which is particularly useful when the photo opportunity is not in the image data that was imaged in the continuous shooting. Although the image that is slow displayed is image data imaged by continuous shooting imaging, the image that is displayed in real-time is image data that is imaged by continuous shooting imaging and frame image data that is imaged by video imaging, so it is not necessarily the case that the image data currently displayed in real-time will be slow displayed.

When the shutter button is fully depressed from the half-depressed state, the image data that is slow displayed in the display area A is recorded and also the normal direct image display is restored. As such, there is no need to provide a separate slow display release button, and the full-depression of the shutter button also causes releasing of the slow display, and thereby simplifying operations of the digital camera 1. Moreover, the same is true when releasing the half-depression of the shutter button, rather than fully depressing the shutter button, where the releasing the half-depression of the shutter button also causes releasing of the slow display, and also thereby simplifying operations of the digital camera 1.

Fourth Embodiment

A fourth embodiment of the invention will now be described with reference to FIGS. 10-13.

In the third embodiment of the invention described above, when the shutter button has not been fully depressed and has not been released from being half-depressed, and the imaging instruction button has not been operated, during the slow display of image data imaged over a predetermined time interval in the continuous shooting imaging process (i.e., when the half-depression of the shutter button continues until the end of the slow display), the display returned to the normal direct image display. However, in the fourth embodiment of the invention, the images that have been slow displayed may be repeatedly played back slowly if the shutter button has not been fully depressed and has not been released from being half-depressed, and the imaging instruction button has not been operated, during the slow display of image data imaged over a predetermined time interval in the continuous shooting imaging process.

This is particularly useful in cases such as when one misses the timing for the operation of fully depressing the shutter button even though the image of the photo opportunity is within the image data obtained in the continuous shooting imaging process, when there are multiple images that might be considered to be the photo opportunity so that there is uncertainty as to which image is best, or the like.

In the fourth embodiment of the invention, the imaging device may be embodied using the digital camera 1 having the same structure as in the third embodiment described above.

The operation of the digital camera 1 in accordance with the fourth embodiment of the invention will be explained with reference to the flowcharts in FIGS. 10 and 11.

Figure 10:
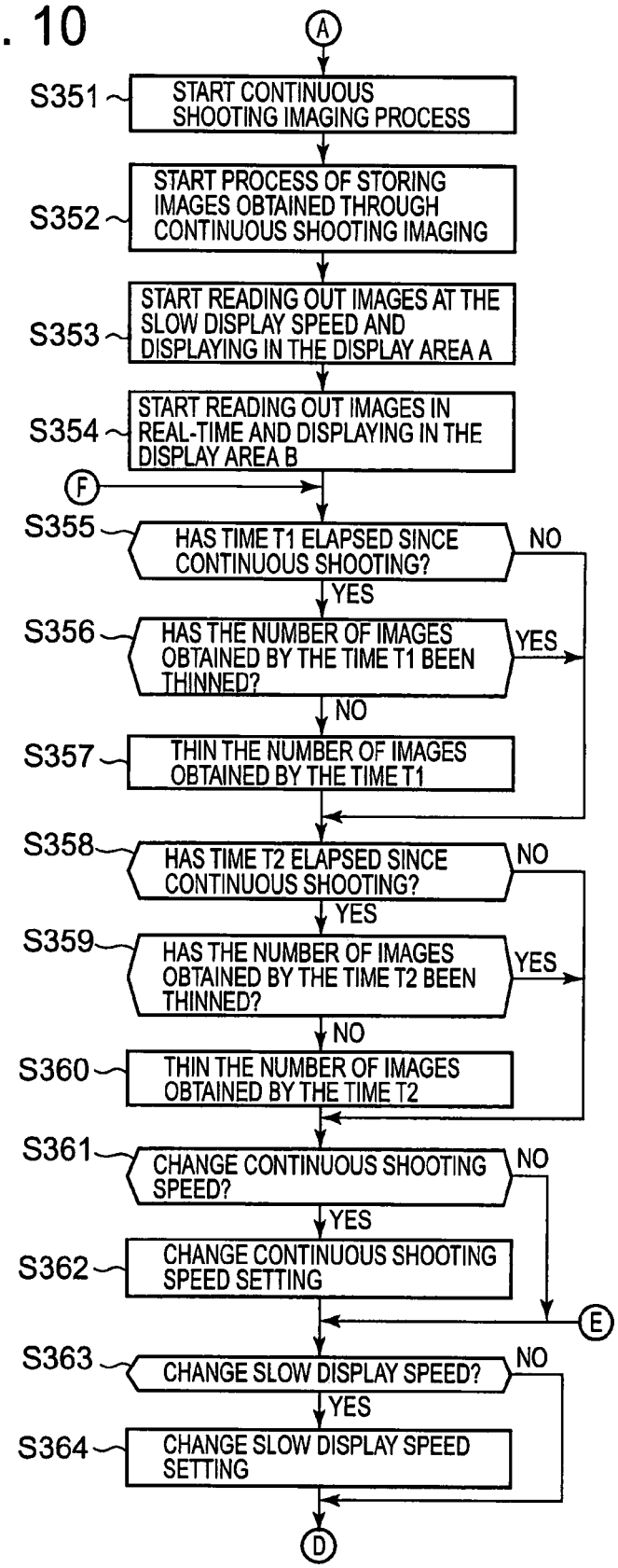
FIG. 10 is a flow chart illustrating the processing sequence in a fourth embodiment of the invention.

If it is determined in Step S303 (see FIG. 6) that the shutter button has been depressed half way, then the DSP/CPU 3 advances processing to Step S351 in FIG. 10, and begins the continuous shooting imaging process that images the subject continuously at the continuous shooting speed stored in the continuous shooting speed storage area (the continuous shooting speed for which the setting was changed in Step S305). At this time, the DSP/CPU 3 starts a timer.

Thereafter, in Step S352, the DSP/CPU 3 starts the process of storing, into the buffer memory, the image data for which continuous shooting imaging was performed by the CCD 2. The image data that was imaged is stored in the buffer memory without updating (overwriting) the memory, i.e., multiple image data is stored in the buffer memory.

Next, in Step S353, the DSP/CPU 3 starts a process that reads out the image data obtained by continuous shooting imaging and stored in the buffer memory and displays this image data in a display area A of the display device 6. The image data is displayed at the slow display speed stored in the slow display speed storage area, i.e., at the slow display speed set in Step S309 in FIG. 6.

This causes the images that are displayed to be slow displayed, enabling a desired photo opportunity to be found more easily, which is particularly useful for a subject that is moving quickly.

Next, in Step S354, the DSP/CPU 3 begins a process that reads out the image data (including image data obtained through continuous shooting imaging and frame image data imaged through video imaging, in Step S373, described below, and stored in the buffer memory) that was imaged by the CCD 2 and stored in the buffer memory. This process is performed at the same speed as the speed with which the image data was imaged (reading out in real-time). The image data is displayed in the display area B of the display device 6, i.e., the captured images are displayed in real-time in the display area B.

Next, the DSP/CPU 3 determines whether time T1 has elapsed since the beginning of the continuous shooting imaging process (Step S355), i.e., it is determined whether the timer has exceeded time T1.

In Step S355, if it is determined that time T1 has elapsed since the beginning of the continuous shooting imaging process (S355: YES), then the DSP/CPU 3 determines whether frames of image data that were continuous shooting imaged have already been thinned by the time T1 (Step S356), i.e., a determination is made as to whether the process in Step S357, described below, has already been performed.

In Step S356, if it is determined that frames of image data, imaged through continuous shooting imaging, have not already been thinned by Time T1 (S356: NO), then the DSP/CPU 3 performs a process that thins multiple frames of image data stored in the buffer memory 11, which were imaged through continuous shooting imaging by the time T1 (Step S357), and then advances the processing to Step S358. The thinning process may be a process that deletes image data that is subject to thinning, or may be a process that changes only image control data to create a state where the area in which the image data subject to thinning is stored can be overwritten with new image data.

The image data may be thinned out, so that, for example, if the continuous shooting imaging process were performed at 60 frames per second and stored in the buffer memory 11, the number of frames of image data remaining after the thinning process would be the same as if the continuous shooting imaging had been performed at 30 frames per second. In other words, the result would be the same as reducing the frame rate for frame images from 60 fps to 30 fps. In one embodiment, every other frame of image data is eliminated.

As a result, the imaging timing of the images displayed through the slow image display will diverge from the imaging timing of the images currently being imaged, and the amount of image data in the buffer memory 11 that has not yet been displayed will gradually increase. However, the number of frames of image data that is stored can be reduced by this thinning process, enabling an increase in the free space in the buffer memory 11.

If it is determined that the time T1 has not elapsed since the beginning of the continuous shooting imaging process (S355: NO), or if it is determined that frames of images that have been imaged by the time T1 have been thinned (S356: YES), then the DSP/CPU 3 advances the processing to Step S358 without taking any other action.

Next, the DSP/CPU 3 determines whether time T2 has elapsed since the beginning of the continuous shooting imaging process (Step S358), i.e., a determination is made as to whether the timer has exceeded time T2. In the process, time T1 may be less than time T2. The continuous shooting time may be longer than time T2.

If it is determined that time T2 has elapsed since the beginning of the continuous shooting imaging process (S358), then the DSP/CPU 3 determines whether frames of image data that were imaged through continuous shooting have already been thinned by the time T2 (Step S359), i.e., a determination is made as to whether the process in Step S360, described below, has already been performed.

If it is determined that frames of image data, imaged through continuous shooting imaging, have not already been thinned by Time T2 (S359: NO), then the DSP/CPU 3 performs a process that thins out multiple frames of image data stored in the buffer memory 11, which were imaged through continuous shooting imaging by the time T2 (Step S360), and then advances the processing to Step S361.

The image data may be thinned out, so that, for example, if the continuous shooting imaging process were performed at 60 frames per second and stored in the buffer memory, the number of frames of image data imaged between time T1 and time T2 would be reduced from 60 to 30, and the number of frames of image data imaged up to time T1 would be reduced from 30 to 15. In one embodiment, every other frame of image data is eliminated.

While the thinning process in Step S357 and Step S360 thinned or eliminated one of every two frames of image data, the present invention is not limited thereto. Moreover, the thinning process in Step S357 may be different from the thinning process in Step S360. For example, in the thinning process in Step S357, one of every three frames of image data may be thinned out or eliminated, and in the thinning process in Step S360, one of every four frames of image data may be thinned out or eliminated.

Figure 12:
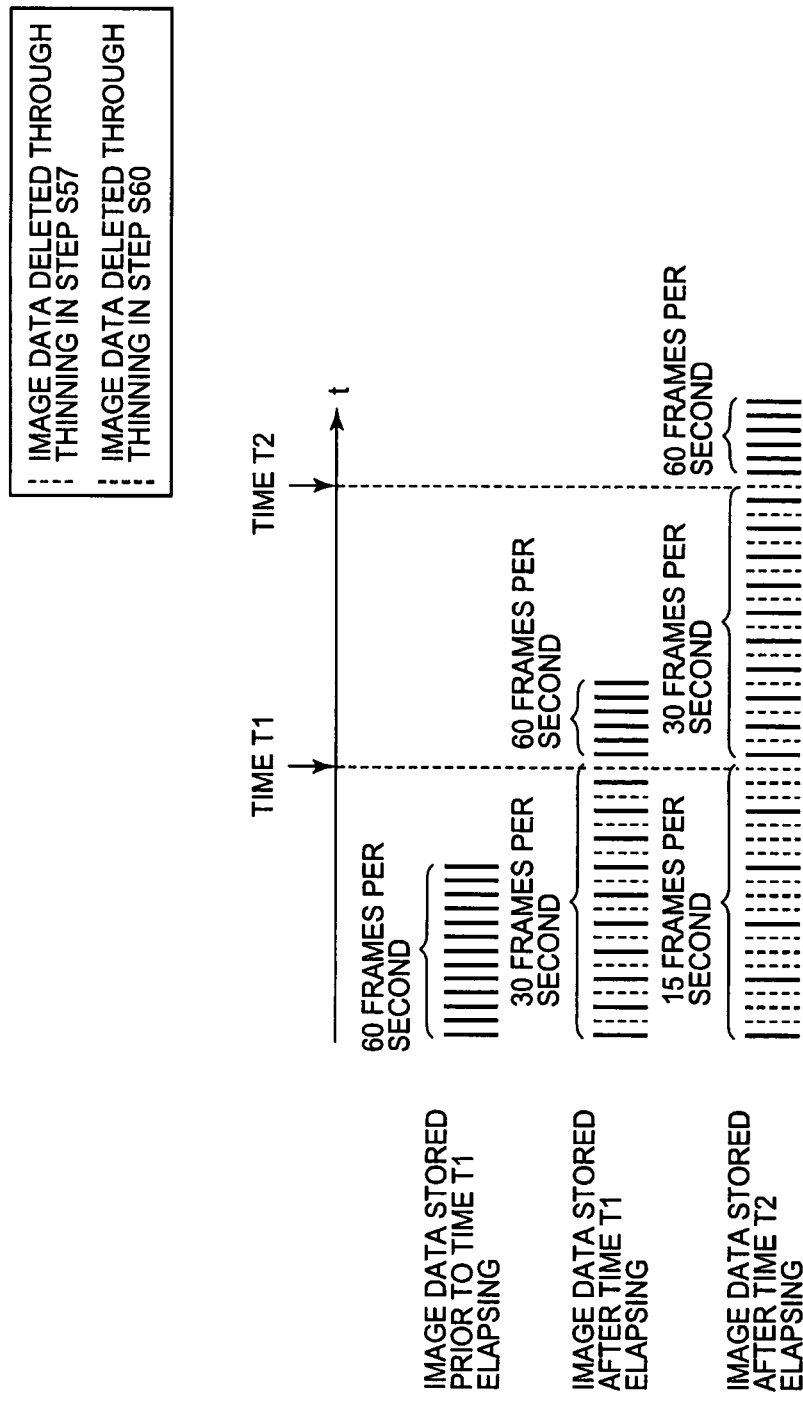
FIG. 12 illustrates the state of image data stored in a buffer memory as time elapses.

FIG. 12 illustrates the state of image data stored in a buffer memory 11 as time elapses. The t axis shows the passage of time after the commencement of continuous shooting imaging.

In FIG. 12, it can be seen that the image data that is imaged by continuous shooting at 60 frames per second is stored until the time T1 has elapsed, and when time T1 has elapsed, only one of each two frames of image data imaged until the time T1 is thinned out, i.e., every other frame of image data, is stored. The heavy lines in FIG. 12 indicate image data that is imaged in the continuous shooting imaging and stored in the buffer memory, and the dotted lines indicate the image data that is deleted by thinning in Step S357. Applying the thinning process, the number of frames of image data stored by the time T1, even when continuous shooting imaging is performed at 60 frames per second and stored, will be caused by the thinning process in Step S357 to be the same as the number of frames of image data that would have been obtained if performing continuous shooting imaging at 30 frames per second.

Moreover, when time T1 has elapsed and time T2 has also elapsed, the image data is thinned out such that only one of every two frames of the image data, i.e., every other frame of image data, imaged up until the time T2 is stored. In FIG. 12, the dotted lines indicate the image data deleted by thinning in Step S360. By applying the thinning process, the number of frames of image data stored by the time T1, even when continuous shooting imaging is performed at 60 frames per second and stored, will be caused by the thinning process in Step S357 to be the same as the number of frames of image data that would have been obtained if performing continuous shooting imaging at 30 frames per second. Similarly, since a number of frames of image data have already been thinned out in Step S357, by time T2 at which the additional thinning Step S360 is performed, even if continuous shooting imaging is performed and stored at 60 frames per second, the number of frames of image data up to time T1 will be the same as had continuous shooting imaging been performed at 15 frames per second. However, from time T1 to time T2, the number of frames of image data being stored are subject only to the thinning Step S360 and if continuous shooting imaging is performed and stored at 60 frames per second, the number of frames of image data from time T1 to time T2 will be the same as had continuous shooting imaging been performed at 30 frames per second. The processes in Step S355 to Step S360 correspond to the processes by a thinning unit in the present invention.

As time passes, the image data stored in the buffer memory is reduced by thinning depending on the age of the image data.

While in the diagram shown in FIG. 12, the image data is thinned in two stages, alternatively, the image data may be thinned in three or more stages as time passes.

The DSP/CPU 3 determines whether to change the setting for the continuous shooting speed (Step S361). At this time, the user can change the settings for the continuous shooting speed by operating the up arrow key ↑ or the down arrow key ↓ of the + key, and the DSP/CPU 3 will determine that the setting for the continuous shooting speed has been changed when an operating signal corresponding to that operation has been sent from the key input unit 7.

If the user wants to increase the continuous shooting speed, the user would operate the up arrow key ↑ of the + key, or if the user wants to decrease the continuous shooting speed, the user would operate the down arrow key ↓ of the + key. In this manner, the user is able to set a continuous shooting speed that is appropriate for the imaging situation when performing the actual continuous shooting imaging.

If it is determined that the setting for the continuous shooting speed is to be changed (S361: YES), then the DSP/CPU 3 temporarily changes the setting for the continuous shooting speed in accordance with these operations (Step S362), and advances the processing to Step S363.

If it is determined that there is no change to the setting for the continuous shooting speed (S361: NO), then the DSP/CPU 3 advances the processing to Step S363 without taking any other action.

This temporary change of settings refers to changing the continuous shooting speed, limited to the current continuous shooting imaging, where even when the settings for the continuous shooting speed are changed in Step S362, the continuous shooting speed for which the settings are changed is not stored in the continuous shooting speed storage area in the buffer memory 11. Consequently, in the next continuous shooting imaging, the continuous shooting process will be performed at the continuous shooting speed stored in the continuous shooting speed storage area by Step S305 in FIG. 6.

When this temporary change of the setting for the continuous shooting speed is performed, the DSP/CPU 3 will change the continuous shooting speed at which continuous shooting imaging is performed by the continuous shooting imaging process. As a result, when the continuous shooting speed setting is changed, the continuous shooting imaging process will be performed at the continuous shooting speed for which the setting has been changed.

The DSP/CPU 3 determines whether to change the setting for the slow display speed (Step S363).

The user can change the settings for the slow display speed by operating the right arrow key → or the left arrow key ← of the + key, and the DSP/CPU 3 will determine that the setting for the slow display speed has been changed when an operating signal corresponding to that operation has been sent from the key input unit 7.

If the user wants to increase the slow display speed here, the user would operate the right arrow key → of the + key. If the user wants to decrease the slow display speed, the user would operate the left arrow key ← of the + key. In this manner, the user is able to set a slow display speed that is appropriate for the imaging situation when performing the actual continuous shooting imaging.

If it is determined that the setting for the slow display speed is to be changed (S363: YES), then the DSP/CPU 3 temporarily changes the setting for the slow display speed in accordance with these operations (Step S364), and advances the processing to Step S365.

If it is determined that there is no change to the setting for the slow display speed (S363: NO), then the DSP/CPU 3 advances the processing to Step S365 without taking any other action.

This temporary change of settings refers to changing the slow display speed, limited to the current continuous shooting imaging, where even when the settings for the slow display speed are changed in Step S364, the slow display speed for which the settings are changed is not stored in the slow display speed storage area in the buffer memory 11.

If it is determined that the setting for the slow display speed is to be changed (S363: YES), then the DSP/CPU 3 temporarily changes the setting for the slow display speed in accordance with these operations (Step S364), and advances the processing to Step S365.

If it is determined that there is no change to the setting for the slow display speed (S363: NO), then the DSP/CPU 3 advances the processing to Step S365 without taking any other action.

This temporary change of settings refers to changing the slow display speed, limited to the current continuous shooting imaging, where even when the settings for the slow display speed are changed in Step S364, the slow display speed for which the settings are changed is not stored in the slow display speed storage area in the buffer memory 11. Consequently, in the next continuous shooting imaging, the continuous shooting process will be performed with the slow display speed stored in the slow display speed storage area by Step S309 in FIG. 6.

When this temporary change of the setting for the slow display speed is performed, the DSP/CPU 3 will change the slow display speed at which the slow display is performed. Accordingly, when the setting of the slow display speed is changed, the images will be read out at the slow display speed for which the setting has been changed, and the images read out will be displayed in the display area A.

A determination is then made as to whether all of the image data obtained by the continuous shooting imaging process has been slow displayed (Step S365).

If it is determined that the slow display of all of the image data obtained by the continuous shooting imaging process has been completed (S365: YES), then the DSP/CPU 3 starts a repeat display that again reads, from the buffer memory 11, the image data obtained from the continuous shooting imaging process, at the slow display speed stored in the slow display speed memory area or the slow display speed for which the setting has just been changed temporarily in Step S364. This image data is displayed in the display area A (Step S366), then processing advances to Step S367.

In this manner, a repeat display is provided so that even if a photo opportunity has been missed, when the image of the photo opportunity is in the slow display, it is possible to obtain the image of the photo opportunity.

If it is determined that the slow display of all of the image data obtained by the continuous shooting imaging process has been completed, then the continuous shooting time has elapsed since the commencement of the continuous shooting imaging process, and the image data thinned in Step S357 and Step S360 in FIG. 10 is stored in the buffer memory 11. In the first-cycle slow display of the image data obtained by the continuous shooting imaging process, the image data is progressively thinned as it is slow displayed, while, in contrast, in the second-cycle slow display and subsequent cycles of slow display, the image data that has already been thinned is slow displayed without modification. As a result, the situations that are shown are different for the first-cycle slow display and the second-cycle slow display.

Specifically, the first-cycle slow display initially displays image data from continuous shooting imaging performed at 60 frames per second, and thereafter the image data that is thinned to, for example, 30 frames per second and 15 frames per second is slow displayed. By contrast, in the second-cycle slow display and subsequent cycles of slow display, image data at 15 frames per second is slow displayed initially, following which image data at 30 frames per second and 60 frames per second is slow displayed.

If it is determined that the slow display of the image data obtained from the continuous shooting imaging process has not been completed (S365: NO), then the DSP/CPU 3 advances the processing to Step S367 without taking any other action.

The DSP/CPU 3 then determines whether the half-depression of the shutter button has been released (Step S367).

If it is determined that the shutter button half-depression has not been released (S367: NO), the DSP/CPU 3 determines whether the imaging instruction button has been operated (Step S368).

If it is determined that the imaging instruction button has not been operated (S368: NO), the DSP/CPU 3 determines whether the shutter button has been fully depressed (Step S369).

If it is determined that the shutter button full-depression operation has not been performed (S369: NO), DSP/CPU 3 determines whether the subject is currently being imaged by the continuous shooting imaging process (Step S370).

If it is determined that the subject is currently being imaged by the continuous shooting imaging process (S370: YES), then it is determined whether the continuous shooting time has elapsed since the commencement of the continuous shooting imaging process (Step S371), i.e., it is determined whether the timer has exceeded the continuous shooting time.

Of the continuous shooting time, wherein the continuous shooting imaging is actually performed, and the slow display time for all of the image data obtained from the continuous shooting imaging, the continuous shooting time is the shorter of the two. As such, prior to the determination in Step S365 as to whether all of the image data obtained by the continuous shooting imaging has been slow displayed, a determination is made in Step S371 as to whether the continuous shooting time has elapsed.

If it is determined that the continuous shooting time has not elapsed (S371: NO), then the DSP/CPU 3 returns the processing to Step S355.

If it is determined that the continuous shooting time has elapsed (S371: YES), then the DSP/CPU 3 ends the continuous shooting imaging process, and starts the video imaging process (Step S372).

Next, the DSP/CPU 3 starts a process to update the storage of image data, obtained through the video imaging process, in the buffer memory (Step S373). At this time, the DSP/CPU 3 stores only a single frame of frame image data obtained through the video imaging process into the buffer memory 11, and when a new frame of image data is imaged, this frame image data that has been imaged is updated (overwritten) in the memory, and processing returns to Step S363 in FIG. 10. The image data that is obtained through the continuous shooting imaging process is stored without modification in the buffer memory 11, and is used in the repeat playback in Step S366.

If it is determined that the subject is not being imaged by the continuous shooting imaging process (S370: NO), then the DSP/CPU 3 returns the processing to Step S363.

If it is determined that the half-depression of the shutter button has been released (S367: YES), then the DSP/CPU 3 advances the processing to Step S376 without taking any other action.

If it is determined that the shutter button has been fully depressed (S369: YES), then the DSP/CPU 3 stores into the storage memory 13 the image data that is currently slow displayed in the display area A (Step S374), and advances the processing to Step S376.

If it is determined that the imaging instruction button has been operated (S368: YES), then the DSP/CPU 3 stores into the storage memory 13 the image data (including frame image data) that is currently displayed in real-time in the display area B (Step S375), and advances the processing to Step S376.

The DSP/CPU 3 determines whether the subject is currently being imaged by the continuous shooting imaging process (Step S376).

If imaging by the continuous shooting imaging process (S376: YES), then the DSP/CPU 3 returns the processing to Step S301.

If imaging by the video imaging process (S376: NO), then the DSP/CPU 3 returns the processing to Step S302, and restores the normal direct image display.

This enables the display of images in real-time until the arrival of the next photo opportunity, enabling a decision as to whether the arrival of a photo opportunity is imminent to be performed appropriately. If the slow display were to be performed even though there is no imminent photo opportunity when the shutter button is fully depressed or when the half-depression is released or the imaging instruction button is depressed when there is no imminent photo opportunity, the timing of the determination that a photo opportunity is imminent made by viewing the image that is slow displayed would be when the photo opportunity has already arrived.

In Step S367, once it has been determined that the half-depression of the shutter button has been released, then processing advances to Step S376 without any further action being taken. When in Step S369 it is determined that the shutter button has been fully depressed, and when in Step S374 the image data that is slow displayed is stored when the shutter button is fully depressed, then processing advances to Step S376 without any further action being taken. When in Step S368 it is determined that the imaging instruction button has been operated and when in Step S375 the image data that is displayed in real-time when the imaging instruction button is operated is stored, then processing advances to Step S376 without any further action being taken. However, the advancement to Step S376 may be after performing a skip display, in the same manner as in Step S327 in FIG. 7 in the third embodiment described above. In this case, it is necessary to store the image obtained from the video imaging process without updating the memory in Step S373 because the skip display would not be possible because the old image data would be erased if the memory were updated. Alternately, it is possible to image and store only those images that are necessary for the skip display. Furthermore, in the stage wherein the image data imaged through the video imaging process is stored in the buffer memory 11, the image data that will not be skip displayed may be thinned and then stored, and this thinned image data may be displayed.

As described above, in the fourth embodiment of the invention, the image data imaged by the continuous shooting imaging process is displayed at a speed (the slow display speed)

that is slower than the imaging speed at which the image data was imaged, making it possible to reliably store only that image corresponding to the photo opportunity desired by the user when capturing the image. Consequently, after the imaging has been completed, it is possible to store only the image corresponding to the photo opportunity, without the need for complex operations to erase images other than the image corresponding to the photo opportunity, i.e., the desired photo.

Moreover, when a slow display has been performed until the end of the image data that has been imaged by the continuous shooting imaging process, the image data imaged by the continuous shooting imaging process is played back repetitively, making it possible to store the image of the photo opportunity even when, for example, the user missed the photo opportunity, or the user was uncertain as to which photo opportunity was best.

Moreover, because a thinning process is performed on the image data stored in the buffer memory 11, imaged through continuous shooting imaging, starting with the oldest image data (the process in Step S355 through Step S360), it is possible to increase the free space in the buffer memory 11, and it is possible to have a different appearance in the images that are slow displayed in the first cycle from the appearance of the images that are played back repeatedly in the second and subsequent cycles.

In addition, the slow image and the real-time image are displayed simultaneously when the shutter button is depressed half-way, so the user can be made aware of the subject that is being imaged currently and also can easily find the photo opportunity image by viewing the slow display.

The image that is displayed in real-time is stored when the imaging instruction button is operated, which is particularly useful when the photo opportunity is not in the image data that was imaged in the continuous shooting, and this photo opportunity is in the frame image data obtained through video imaging. Moreover, when the shutter button is fully depressed from the half-depressed state, the image data being slow displayed in the display area A is recorded, and also the normal direct image display is restored, so there is no need to provide a separate slow display release button. The full-depression of the shutter button also causes releasing of the slow display, thereby simplifying operations of the digital camera 1. Moreover, the same is true for releasing the half-depression of the shutter button, rather than fully depressing the shutter button, where the releasing of the half-depression of the shutter button also causes releasing of the slow display, and again simplifying operations of the digital camera 1.

Additional Embodiments

Any of the various embodiments described above may be modified to include the following variations.

(1) While in the third and fourth embodiments of the invention, the video imaging process was performed when the continuous shooting imaging process exceeded a predetermined time, alternatively, the imaging may be performed for only those images with the timing necessary for the skip display. In other words, instead of the video imaging process described in the third and fourth embodiments, an imaging process that images the subject at predetermined intervals (for example, the timing required for the skip display) may be used.

The image data imaged by this imaging process may be displayed instead of the skip displays as described above.

In this manner, it is possible to reduce the processing load on the DSP/CPU 3 and the power consumption thereof because it is not necessary to image the frame image data with timing that will not be skip displayed, because the frame image data that will be thinned out is not necessary when thinning and displaying the frame images in the skip display.

When an imaging process that images at predetermined periods is used instead of the video imaging process, the video imaging process may be started when the skip display has been completed in order to restore the normal direct image display.

(2) While in the third and fourth embodiments of the invention, the image data was thinned and displayed in the skip display, alternatively, image data for a predetermined number of frames may be combined together and displayed. For example, one frame of image data may be synthesized based on 10 frames of image data.

(3) While in the third and fourth embodiments of invention, the continuous shooting imaging process commenced with the half-depression of the shutter button (Step S310 in FIG. 6 and Step S351 in FIG. 10), and the slow display was performed using the image data obtained by this continuous shooting imaging process (Step S312 and Step S353), alternatively, the slow display may be performed using frame image data for a specific number of frames (a specific amount of time) imaged prior to the half-depression of the shutter.

Since the frame image data imaged prior to the half-depression of the shutter is already displayed by the normal direct image display (Step S302 in FIG. 6), the frame image data for a specific number of frames imaged prior to the half-depression of the shutter is displayed again.

Figure 13:
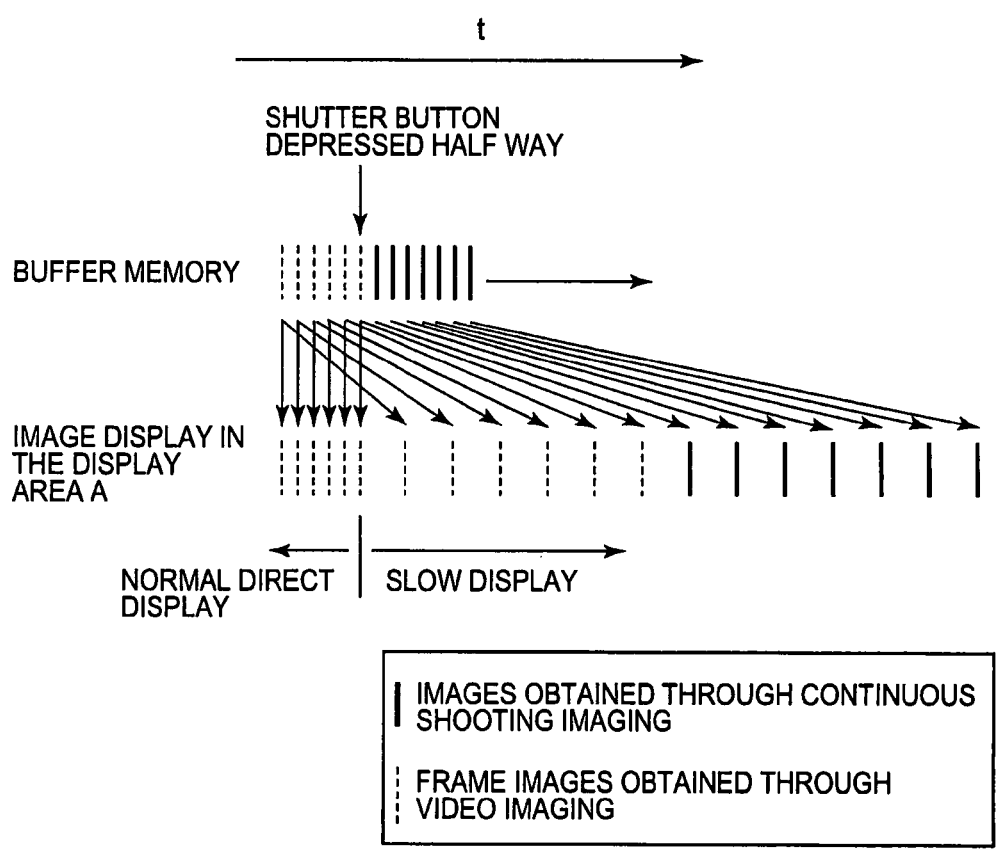
FIG. 13 illustrates the state of image data being slow displayed by half-depression of the shutter button.

FIG. 13 illustrates this alternative technique and as shown in FIG. 13, when the shutter is depressed half-way, the image data imaged by the continuous shooting imaging process is slow displayed beginning with the slow display of the frame a specific number of frames earlier. This enables an image of the photo opportunity to be obtained because it is possible to repeatedly play back the image of the photo opportunity even when the half-depression of the shutter button was with timing that was later than the photo opportunity, because the slow display is from image data prior to the half-depression of the shutter button.

In this case, it is necessary to perform a recording process of continually storing in the buffer memory 11, frame image data a specific number of frames back, without updating the memory, for the frame image data obtained by the video imaging process, even during normal direct display.

The user may be allowed to set the specific number of frames or specific time interval as desired.

Figure 11:
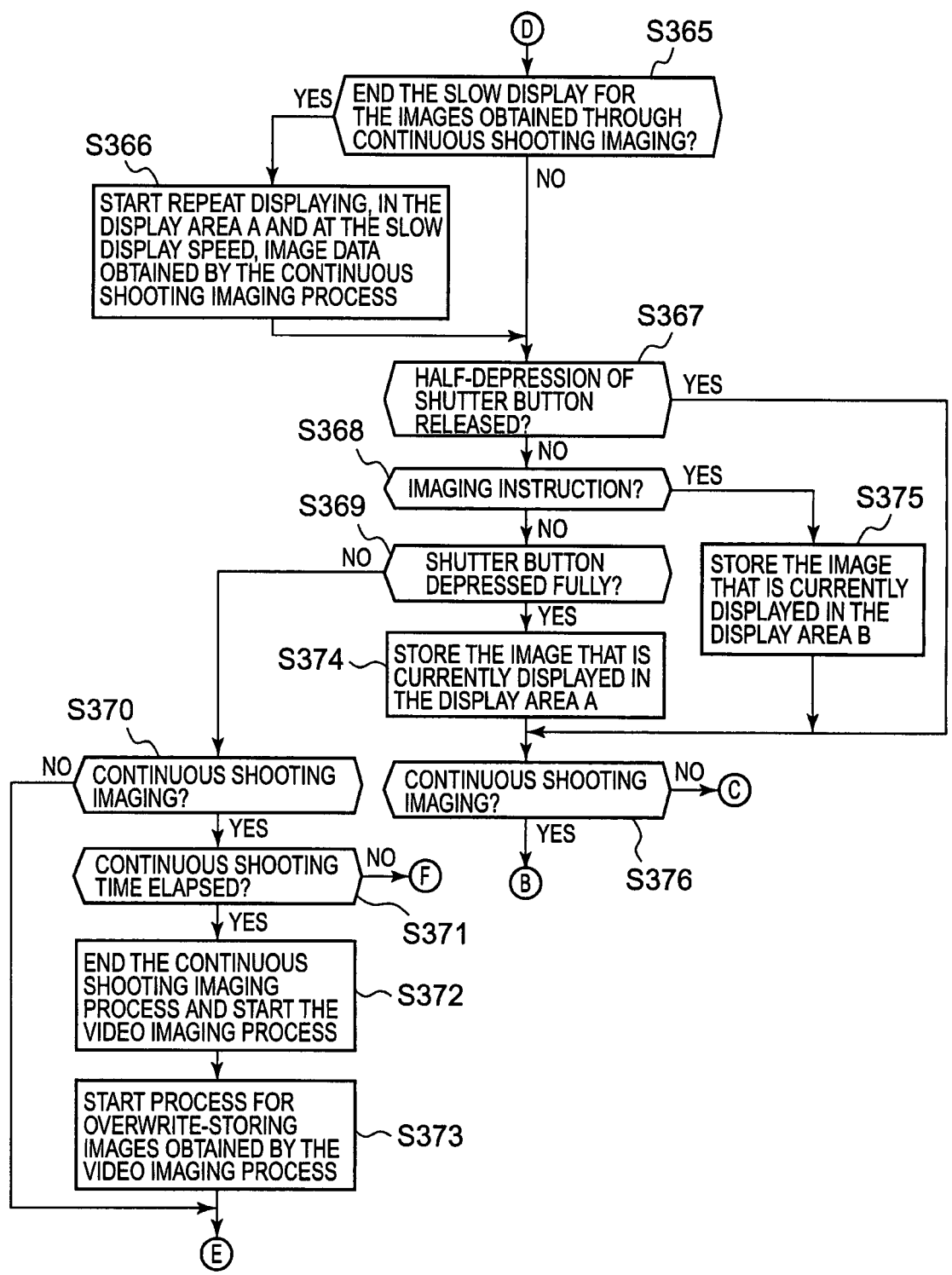
FIG. 11 is a flow chart illustrating the processing sequence in the fourth embodiment of the invention.

(4) When the alternative embodiment (3), described above, is applied to the fourth embodiment of the invention, the image data displayed may be displayed repetitively without modification as the slow display when performing the repeat display in Step S366 in FIG. 11. Specifically, a slow and repeated display may be performed using frame image data of a predetermined number of frames obtained through video imaging prior to the half-depression of the shutter (prior to the continuous shooting imaging process).

(5) While in the third and fourth embodiments of the invention, it was not possible to change the setting for the continuous shooting time during the slow display, alternatively, an embodiment of the invention enables a change in the setting for the continuous shooting time. As a result, imaging may be performed by continuous shooting imaging of the image of the photo opportunity by elongating the continuous shooting time when it has been determined that the photo opportunity will not come within the continuous shooting time that has been set.

When the continuous shooting time is shortened, the time, of course, cannot be made shorter than the time that has already elapsed since the beginning of the continuous shooting imaging process because even if the time is shortened, the imaging has already been performed through continuous shooting imaging.

(6) In the third and fourth embodiments of the invention, the image data displayed in real-time by the normal direct image display may be stored when the shutter button is fully depressed if the shutter button is fully depressed quickly without requiring a half-depression of the shutter button.

Moreover, the image data displayed in real-time in the normal direct image display may be stored when the imaging instruction button is operated, if the imaging instruction button is operated without requiring a half-depression of the shutter button.

(7) While in the third and fourth embodiments of the invention, the slow image display is directed by the half-depression of the shutter button, storing of the image slow displayed in the display area A is directed by the full-depression of the shutter button, and storing of the image displayed in real-time in the display area B is directed by the operation of the imaging instruction button, in alternative embodiments, the various commands may be performed instead by other buttons.

For example, a SLOW DISPLAY button may be provided, and the slow display may be started when the SLOW DISPLAY button is operated.

(8) While in the third and fourth embodiments of the invention, the continuous shooting imaging process is performed when the shutter button is depressed half-way, alternatively, the video imaging process may be performed instead of the continuous shooting imaging process. In this case, the imaging control (for example, the frame rate) may be different for the video imaging process after the half-depression of the shutter button from the video imaging process before the half-depression of the shutter button.

Moreover, for all embodiments of the invention, the continuous shooting imaging process may be performed instead of the video imaging process.

In this case, the continuous shooting time refers to the time interval for imaging the images that will be slow displayed after the images that are imaged by the continuous shooting imaging process or the video imaging process.

(9) In the third and fourth embodiments of the invention, after there has been a switch from the continuous shooting imaging process to the video imaging process (in Step S324 in FIG. 7 and Step S327 in FIG. 11), notification may be made to the user that there has been a switch. For example, there may be a display on the display device 6 indicating that there has been a switch, or a sound may be produced.

This enables the user to be notified that the images being imaged are images that will not be slow displayed.

(10) While in the third embodiment of the invention, the continuous shooting imaging process is performed during the continuous shooting time, alternatively, the continuous shooting imaging process may be performed while the shutter button is depressed half-way, without setting a continuous shooting time in advance.

(11) While in the third embodiment of the invention, the display area A is the slow display and the display area B is the real-time display, in alternative embodiments, a first shutter button and a second shutter button that can be depressed half-way or depressed fully may be provided, and the first shutter button may be associated with the display area A and the second shutter button may be associated with the display area B.

For example, when the first shutter button is depressed half-way, the image data imaged through continuous shooting beginning at the time at which the first shutter button was depressed half-way is slow displayed in the display area A, and when the second shutter button is depressed half-way, the image data imaged through continuous shooting beginning at the time at which the second shutter button was depressed half-way is slow displayed in the display area B.

Moreover, when both shutter buttons have been depressed half-way, the display area that performed the slow display first with the half-depression of the shutter button may be restored to a real-time display. In order to avoid having both display areas perform the slow display simultaneously, the slow display may be performed on one on display area wherein the shutter button was most recently depressed half-way, and the display may be in real-time for the display area for which the shutter button was depressed half-way first. For example, if the second shutter button is depressed half-way after the first shutter button has been depressed half-way, then the display area A, which had been performing a slow display, is switched to a real-time display, and the display area B is switched to the slow display.

(12) The process wherein the image data stored in the buffer memory, imaged by continuous shooting imaging, is thinned beginning with the oldest image data as time elapses (the process in Step S355 through Step S360), explained in the fourth embodiment of the invention, may also be applied to the third embodiment of the invention. As a result, free space in the buffer memory 11 may be secured or obtained.

Moreover, while in the third embodiment of the invention, a process is performed wherein the image data stored in the buffer memory, imaged by continuous shooting imaging, is thinned beginning with the oldest image data as time elapses (the process in Step S355 through Step S360), this process is not required, i.e., does not have to be performed.

Furthermore, as an alternative to the method for thinning the image data stored in the buffer memory, imaged by continuous shooting imaging, beginning with the oldest image data as time elapses, wherein the image data imaged by continuous shooting imaging up until a predetermined time (T1 or T2) is thinned when a predetermined time elapsed after the time of commencement of the continuous shooting imaging process, using the time of commencement of the continuous shooting imaging process as a reference, in an alternative embodiment of the invention, the thinning process may be performed periodically on the image data prior to a predetermined time (or predetermined number of frames) prior to the current time.

For example, if the process of thinning the image data from more than five seconds earlier is performed periodically, then, as time elapses, the number of times that the old image data is thinned would become large, and the number of times that the new image data is thinned would be small. As a result, of the image data stored in the buffer memory 11, the older the image data, the more it will have been thinned.

(13) While in the fourth embodiment of the invention, if it is determined that the shutter button has been fully depressed (Step S369: YES), then, in Step S374, the normal direct image display is restored after the image data has been stored, in an alternative embodiment, processing may be advanced to Step S370 after storing the image data in Step S374 if the shutter button has been fully depressed. Accordingly, with the full-depression of the shutter button, the slow display and slow repeat display of the image data obtained by the continuous shooting imaging process is not terminated.

In this embodiment, it is possible to store any number of images considered to be photo opportunities that are within the image data obtained by the continuous shooting imaging process, without returning to the normal direct image display even when the shutter button is fully depressed, because the slow display is not terminated even when the shutter button is fully depressed.

(14) While in the third and fourth embodiments of the invention, the setting could be changed for only the continuous shooting speed of the continuous shooting imaging process, in an alternative embodiment, it is possible to change, at the same time, the imaging interval (the frame rate) as well, which affects the imaging by the video imaging process.

(15) While in the third and fourth embodiments of the invention, the slow display and real-time display were performed when the shutter button was depressed half-way, in an alternative embodiment, information may be displayed indicating the timing with which the images were imaged for the images displayed by the slow display.

An exemplifying display of this embodiment will be explained with reference to FIGS. 14A-14E which illustrate timing charts for showing the image that is displayed on the display device 6.

Figure 6:
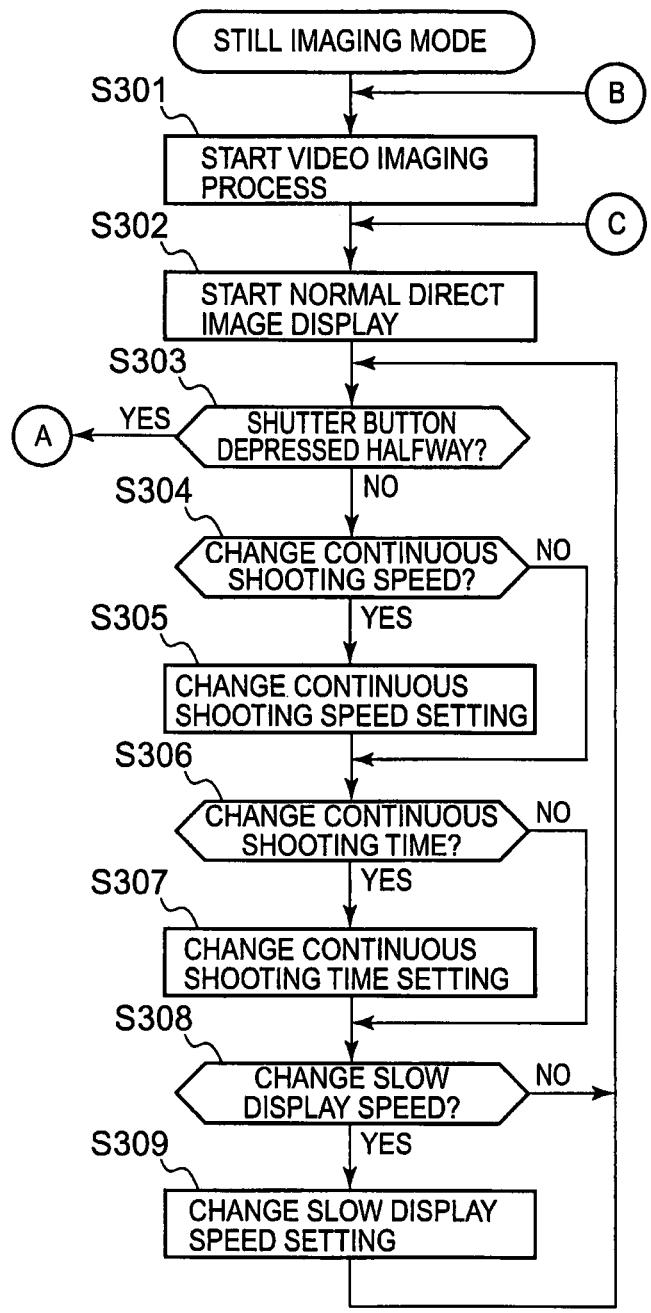
FIG. 6 is a flow chart illustrating the processing sequence in a third embodiment of the invention.

In Step S303 in FIG. 6, the normal direct images are displayed on the display device 6, as shown in FIG. 14A, until it is determined that the shutter button is depressed half-way.

Figure 7:
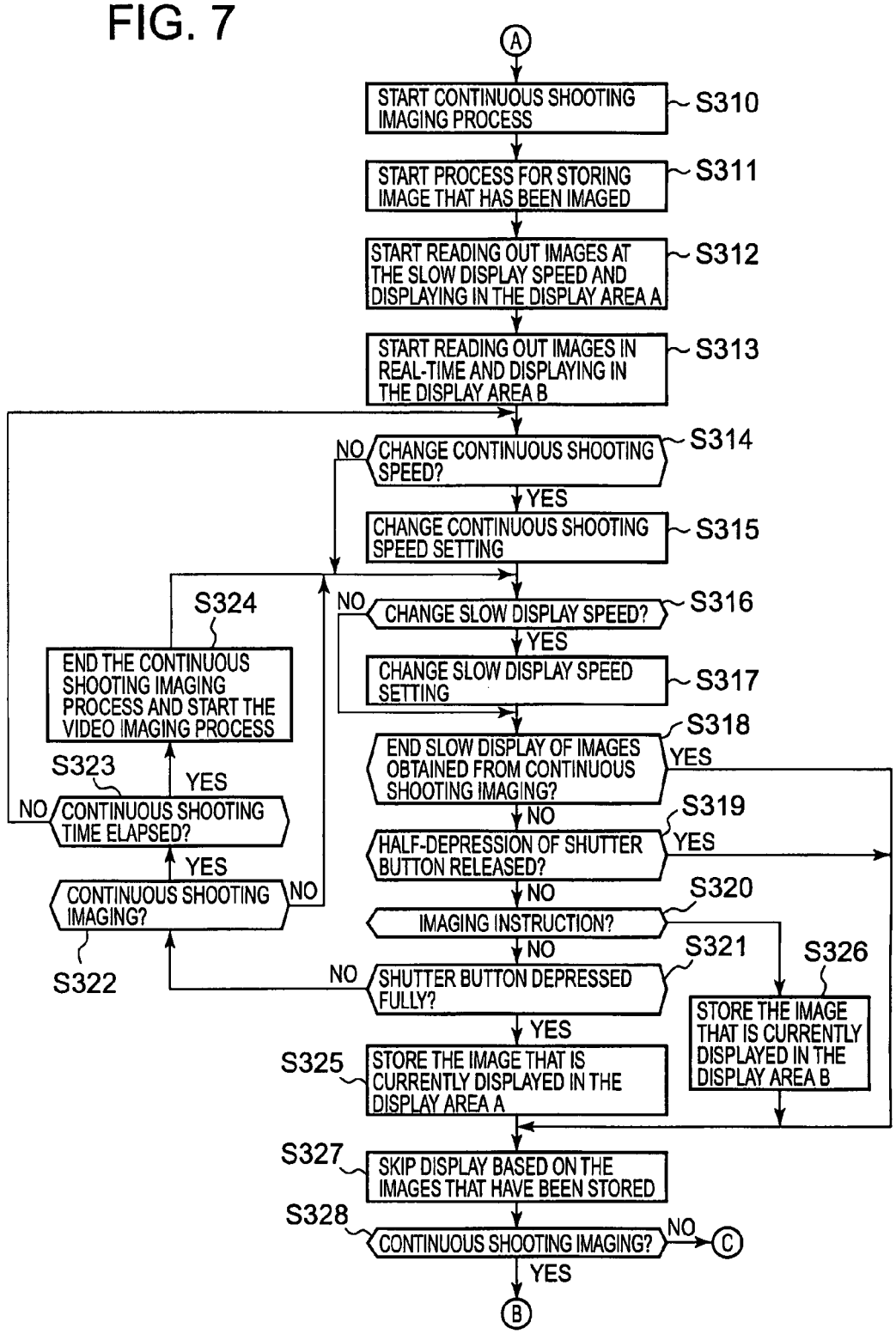
FIG. 7 is a flow chart illustrating the processing sequence in the third embodiment of the invention.

After this, in Step S303 of FIG. 6, when it is determined that the shutter button has been depressed half-way, then, as shown in FIG. 14B, the continuous shooting imaging process is started in Step S310 of FIG. 7 or Step S351 of FIG. 10, and the image data that is imaged by the continuous shooting imaging process is stored in the buffer memory a slow display is performed in the display area A of the display device 6 (Step S312 or Step S353), and a real-time display is performed in the display area B of the display device 6 (Step S313 or Step S354). The notation of "×0.5" at the upper left in FIG. 14B indicates the current slow display speed, where, as a rule, the slow display speed that is set in Step S309 in FIG. 6 is displayed. When the slow display speed has been changed during the slow display (Step S317 in FIG. 7 or Step S364 in FIG. 10), the slow display speed that has been changed will be displayed. As a result, the user can see the slow display speed that is currently set.

At this time, a slow display bar is also displayed at the same time, as shown in FIG. 14B, i.e., the slow display bar is also displayed during the slow display. This slow display bar shows the timing with which the image data currently slow displayed was imaged. FIG. 14B illustrates the situation immediately after the shutter button was depressed half-way.

Figure 15A:
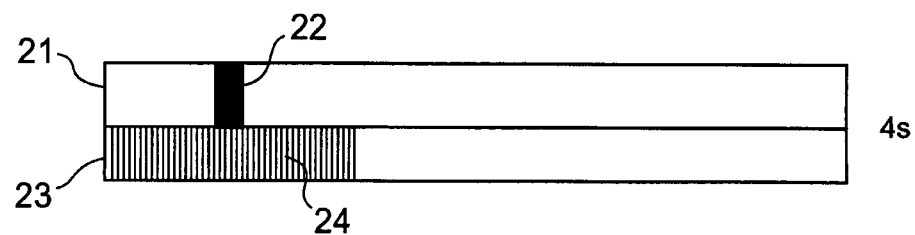
FIGS. 15A and 15B are diagrams showing a slow display bar.
Figure 15B:
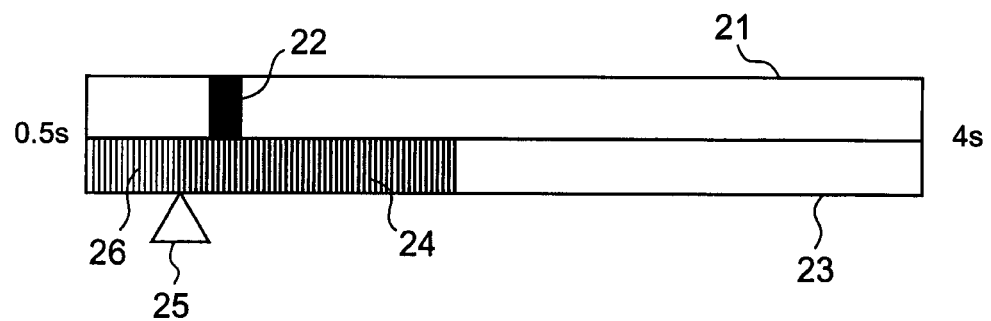

The slow display bar will be explained below with reference to FIG. 15A. FIGS. 15A and 15B are diagrams for explaining the slow display bar.

As shown in FIGS. 15A and 15B, the slow display bar is provided with the display bar 21 and a cache bar 23. Reference notation "4 s" (4 seconds) displayed to the right of the display bar 21 and the cache bar 23 indicates the imaging time of the image data that is slow displayed, referred to as the "continuous shooting time" (see FIG. 14B), i.e., the continuous shooting time set by the user will be displayed. The number of imaging frames may be displayed instead of the continuous shooting time so that the user can see the imaging time (continuous shooting time) over which the images that will be slow displayed will be imaged.

The left end of the display bar 21 and cache bar 23 shows the time at which the shutter button was depressed half-way, and the right end of the display bar 21 and cache bar 23 shows the continuous shooting time that has elapsed (in this case, 4 seconds) since the time at which the shutter button was depressed half-way.

In the display bar 21, there is a display timing portion 22 which moves within the range of the display bar 21 and indicates the timing with which the image that is currently displayed in the slow display was imaged (stored).

The vertical line portion 24 within the cache bar 23 indicates the memory status of the buffer memory of the image data (image data imaged by continuous shooting imaging), imaged since the time at which the shutter button was depressed half-way, where the timing, after the half-depression of the shutter button, with which the image data was actually stored can be seen by examining this vertical line portion 24. While vertical line portion 24 indicates the image data imaged (stored) from the time at which the shutter button was depressed half-way, alternatively, it may be used to show only the timing of the current imaging (storing), as with the display timing portion 22.

Referring again to FIG. 14B, the amount of image data stored in the buffer memory, as can be seen by examining the cache bar 23, is small, because this time is still immediately after the shutter button was depressed half-way. Moreover, because this is immediately after the half-depression, there is little divergence between the timing at which the most recently stored image data was imaged (the position at the right end of the vertical line portion 24) and the timing at which the image currently displayed was imaged (the position of the display timing portion 22).

Additionally, as shown in FIGS. 14C and 14D, as time passes, the amount of image data that is stored increases (causing the vertical line portion 24 of the cache bar 23 to elongate), and also the timing with which the most recently stored image data was imaged (the position of the right end of the vertical line portion 24) and the timing with which the image that is currently displayed was imaged (the position of the display timing portion 22) diverge.

However, as shown in FIG. 14D, when all of the image data that is displayed by the slow display has been imaged (when the continuous shooting imaging has been completed), the image data that is slow displayed is not stored, and so the difference between the timing of the imaging of the most recently image data imaged by the continuous shooting imaging process (the position of the right end of the vertical line portion 24) and the timing with which the image that is currently displayed was imaged (the position of the display timing portion 22) is gradually reduced.

As a result, it is possible to see the timing with which the image data that is currently slow displayed was imaged, among the image data that was imaged for the slow display, and to see how much slow display is remaining.

Moreover, because the storage (imaging) status of the image data that is slow displayed is also displayed, it is possible to see the timing of the image data that is currently being imaged, and to see how much more imaging can be performed.

The slow display bar may or may not be displayed when the skip display is performed. If the slow display bar is displayed, and if the image data that is imaged in the continuous shooting imaging is skip displayed instead of being slow displayed, then the display timing portion 22 may be displayed at the position of the image data that is skip displayed, together with the skip display. Moreover, even at this time, this may be displayed along with the display speed. In this case, this will be high-speed playback due to the skip display, so text such as "×2.0" or "×3.0" will be displayed.

(16) When alternative embodiment (3) is applied in combination with alternative embodiment (15), i.e., alternative embodiment (15) is applied when a slow display is performed based on image data for a specific number of frames (a specific amount of time) imaged prior to the half-depression when the shutter button is depressed half way, the following variation may be performed.

FIG. 15B shows a slow display bar that is displayed in this alternative embodiment, and those portions that are identical to those in FIG. 15A are assigned identical reference numerals, and explanations thereof are omitted.

The triangle portion 25 in FIG. 15B indicates the timing at which the shutter button is depressed half-way, and the thin vertical line portion 26 indicates the frame image data stored in the buffer memory up until the timing with which the shutter button was depressed half-way. The thin vertical line portion 26 indicates the frame image data that is maintained, because, even if the shutter button is depressed half-way, the frame image data from the present time back to a specific time previous thereto is maintained. The vertical line portion 24 is referred to here as the "thick vertical line portion 24."

An exemplifying display in the alternative embodiment (16) will be explained using FIGS. 16A-16D.

FIGS. 16A-16D illustrate timing charts for displaying the image that is displayed on the image display device in this alternative embodiment.

FIG. 16A indicates the state of the image that is displayed immediately after the commencement of the direct image display after the still imaging mode has been set. As seen in FIG. 16A, frame image data for a specific time interval has not yet been imaged, so the thin vertical line portion 26 can be seen apart from the left end of the cache bar 23 from the position of the triangle portion 25. The display timing portion 22 is not displayed on the display bar 21 until the shutter button is depressed half-way.

As shown in FIG. 16B, as time elapses frame image data is stored in the buffer memory, and when a specific time has elapsed (when frame image data for the specific time has been stored), then, as shown in FIG. 16C, the thin vertical line portion 26 is displayed from the position of the triangle portion 25 to the left end of the cache bar 23.

When a specific time has elapsed, the frame image data for the specific time, stored in the buffer memory, is updated to new frame image data.

When the shutter button is depressed halfway, images from a specific time prior to the half-depression of the shutter button will be slow displayed, so that, as shown in FIG. 16D, the display timing portion 22 is positioned at the left end of the display bar 21, and as time elapses, the display timing portion 22 will move to the right. Moreover, the shutter button is depressed half-way and the image data that is imaged by the continuous shooting imaging process is stored in the buffer memory as well, where this storage status is indicated by the thick vertical line portion 24 in the same manner as in the alternative embodiment (15), described above.

While the slow display bar is displayed even in the normal direct image display, the slow display bar may be displayed, as shown in FIG. 16D after the shutter button is depressed half-way.

While in the alternative embodiments (15) and (16), described above, the cache bar 23 was displayed, in another embodiment, the display bar 21 may be displayed alone.

The display may use a method other than the direct display bar. For example, instead of the display bar 21, a ratio, such as "1/5," of the total number of image data (time) imaged in the continuous shooting imaging process, and the number of image data (time) that has been slow displayed, may be used to display the timing with which the image that is currently displayed in the slow display was imaged (stored). Moreover, the same is true for the cache bar 23, which can be displayed as a ratio of the total number of image data (time) imaged by continuous shooting imaging, and the number of image data (time) imaged (stored) thus far. Indeed, any method may be used wherein it is possible to tell the timing with which the image that is currently slow displayed was imaged (stored), and the timing with which the image data is currently imaged (stored).

While the continuous shooting time (in this case, 4 s) is shown on the right side of the display bar 21 and the cache bar 23, in another embodiment, the slow display time (the time over which the image data that has been imaged through continuous shooting will be slow displayed) may be displayed at the right side of the display bar 21, and the continuous shooting time may be displayed at the right side of the cache bar 23. Accordingly, the user can see the slow display time over which the slow display will be performed, and the imaging time (continuous shooting time) over which the images that will be slow displayed will be imaged.

This slow display time will vary depending on the current slow display speed and on the continuous shooting time. For FIGS. 14A-14E and FIGS. 16A-16D, the slow display speed is ×½ and the continuous shooting time is 4 s, so the slow display time will be 8 s (eight seconds).

In the timing charts shown in FIGS. 16A-16D, the same is true for the specific time that is displayed on the left side of the display bar 21 and the cache bar 23, where the slow display time (in this case, 1 s) is displayed on the left side of the display bar 21, and the specific time (in this case, 0.5 s) is displayed on the left side of the cache bar 23.

(17) The alternative embodiments (1)-(16), described above, may be combined as desired.

(18) Finally, while in the embodiments described above, the descriptions were for cases wherein the imaging apparatus as set forth in the present invention is applied to a digital camera, the application may alternatively be applied to mobile telephones with cameras, PDAs with cameras, PCs with cameras, IC recorders with cameras, digital video cameras, and so forth, insofar as it is a device that can image a subject.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

The invention claimed is:

1. An imaging apparatus comprising:
   an imaging unit for capturing sequential images of a subject according to a predetermined imaging frame rate and for outputting image data;
   a buffer unit for temporarily holding the image data that is sequentially outputted from the imaging unit;
   a display unit for displaying the image data;
   a slow display control unit for executing a slow display process for slow-motion displaying the image data that is outputted from the imaging unit at the imaging frame rate on the display unit at a display frame rate that is lower than the imaging frame rate by supplying the image data to the display unit via the buffer unit, in response to a slow display instruction operation;
   a recording unit for recording the image data,
   a buffer control unit for controlling, in response to the slow display instruction operation, the buffer unit to hold image data of a single frame which is inputted to the buffer unit at a time at which the slow display instruction operation is performed, as initial image data for the slow-motion displaying, and to simultaneously hold image data of plural frames which are inputted to the buffer unit subsequently thereafter; and a recording control unit for recording onto the recording unit, in response to a first recording instruction operation that is performed while the slow display control unit is executing the slow display process, still image data corresponding to the image of the subject that is displayed on the display unit at a time at which the first recording instruction operation is performed.

2. The imaging apparatus as set forth in claim 1, further comprising:

a direct display control unit for executing a direct display process for displaying, on the display unit at a display frame rate that is the same as the imaging frame rate, the image data that is outputted from the imaging unit at the imaging frame rate; and a first display setting unit for switching from the direct display process performed by the direct display control unit to a slow display process performed by the slow display control unit in response to the slow display instruction operation being performed while the direct display control unit is executing the direct display process.

3. The imaging apparatus as set forth in claim 2, further comprising a second display setting unit for switching from the slow display process performed by the slow display control unit to a direct display process performed by the direct display control unit in response to a direct display instruction operation performed while the slow display control unit is executing the slow display process.

4. The imaging apparatus as set forth in claim 3, wherein the slow display instruction operation and the direct display instruction operation are identical operations that differ temporally.

5. The imaging apparatus as set forth in claim 2, further comprising a second display setting unit for switching from the slow display process performed by the slow display control unit to a direct display process performed by the direct display control unit in response to a predetermined slow display time elapsing while the slow display control unit is executing the slow display process.

6. The imaging apparatus as set forth in claim 5, further comprising a reporting unit for reporting information pertaining to time remaining in the predetermined slow display time.

7. The imaging apparatus as set forth in claim 2, further comprising a second display setting unit for switching from the slow display process performed by the slow display control unit to the direct display process performed by the direct display control unit in response to a direct display instruction operation and a predetermined slow display time elapsing while the slow display control unit is executing the slow display process.

8. The imaging apparatus as set forth in claim 2, wherein the recording control unit records onto the recording unit image data corresponding to the image of the subject displayed on the display unit by the direct display control unit in response to a second recording instruction operation performed while the direct display control unit is executing the direct display process.

9. The imaging apparatus as set forth in claim 2, wherein the recording control unit executes an imaging process in the imaging unit and records onto the recording unit image data obtained by the imaging process in response to a second recording instruction operation performed while the direct display control unit is executing the direct display process.

10. The imaging apparatus as set forth in claim 1, further comprising a setting unit for adjustably setting the display frame rate;

wherein said slow display control unit displays the image data on the display unit at the display frame rate set by the setting unit.

11. The imaging apparatus as set forth in claim 1, wherein the buffer control unit controls the buffer unit to stop simultaneously holding image data of plural frames in response to an instruction operation to end the slow display process.

12. The imaging apparatus as set forth in claim 1, wherein the buffer control unit controls the buffer unit to stop simultaneously holding image data of plural frames in response to a predetermined time elapsing while the slow display control unit is executing the slow display process.

13. The imaging apparatus as set forth in claim 1, further comprising an intermediate display control unit for performing an intermediate display process that displays on the display unit at a frame rate that is higher than the imaging frame rate, image data that is stored in the buffer unit for which the slow display process has not been performed by the slow display control unit.

14. The imaging apparatus as set forth in claim 1, further comprising a data thinning unit for thinning data from the buffer unit sequentially beginning with older data, with the passage of time in the imaging performed by the imaging unit.

15. The imaging apparatus as set forth in claim 1, wherein the slow display control unit performs the slow display process on the image data imaged over a predetermined time by the imaging unit.

16. The imaging apparatus as set forth in claim 15, further comprising an instruction unit for performing the slow display instruction operation;

wherein the slow display control unit starts the slow display process for the image data imaged by continuous shooting imaging by the imaging unit based on a timing provided by the instruction unit.

17. The imaging apparatus as set forth in claim 16, wherein the slow display control unit performs the slow display process for the image data imaged by the imaging unit from a specific time prior to the timing at which the instruction unit performed the slow display instruction operation.

18. The imaging apparatus as set forth in claim 1, further comprising a detecting unit for detecting an end instruction for the slow display process;

wherein the slow display control unit ends the slow display process when the end instruction for the slow display process is detected by the detecting unit.

19. The imaging apparatus as set forth in claim 18, further comprising a direct display control unit for executing a direct display process for displaying, on the display unit at a display frame rate that is the same as the imaging frame rate, the image data that is outputted from the imaging unit at the imaging frame rate;

wherein the direct display control unit starts the direct display process after the slow display process is ended by the slow display control unit.

20. The imaging apparatus as set forth in claim 18, further comprising a direct display control unit for executing a direct display process for displaying, on the display unit at a display frame rate that is the same as the imaging frame rate, the image data that is outputted from the imaging unit at the imaging frame rate;

wherein:

the slow display control unit includes a display adjusting unit that performs skip display on the display unit of image data imaged by the imaging unit for which the slow display process has not been performed by a point in time at which the slow display process end instruction is detected by the detecting unit; and the direct display control unit starts the direct display process for the image data, imaged by the imaging unit, after the end of the skip display performed by the display adjusting unit.

21. The imaging apparatus as set forth in claim 18, further comprising a direct display control unit for executing a direct display process for displaying, on the display unit at a display frame rate that is the same as the imaging frame rate, the image data that is outputted from the imaging unit at the imaging frame rate;

wherein:

the imaging unit outputs image data by sequentially imaging the subject after reducing the imaging frame rate from the end of the imaging of the image data that is displayed by the slow display control unit on the display unit until the start of the direct display process that is performed by the direct display control unit;

the slow display control unit includes a display adjusting unit that displays in response to a given instruction operation, the image data imaged by the imaging unit for which the slow display process has not been performed by a point in time at which the given instruction operation was performed; and the direct display control unit performs the direct display process for the image data, imaged by the imaging unit after the end of the display performed by the display adjusting unit.

22. The imaging apparatus as set forth in claim 18, further comprising a direct display control unit for executing a direct display process for displaying, on the display unit at a display frame rate that is the same as the imaging frame rate, the image data that is outputted from the imaging unit at the imaging frame rate;

wherein:

the slow display control unit includes a display adjusting unit that displays on the display unit at a frame rate that is higher than the imaging frame rate, the image data imaged by the imaging unit for which the slow display process has not been performed by a point in time at which the slow display process end instruction is detected by the detecting unit; and the direct display control unit performs the direct display process for the image data, imaged by the imaging unit after the end of the display performed by the display adjusting unit.

23. The imaging apparatus as set forth in claim 18, wherein the detecting unit detects the end instruction for the slow display process if any one of the following conditions is satisfied:

if the first recording instruction operation has occurred;
if there has been an instruction by the user to end the slow display; or
if a predetermined slow display time has elapsed since the beginning of the slow display process.

24. The imaging apparatus as set forth in claim 18, wherein the detecting unit detects the end instruction for the slow display process if the slow display process has been performed for all of the image data imaged over a predetermined time by the imaging unit.

25. The imaging apparatus as set forth in claim 18, further comprising a direct display control unit for executing a direct display process for displaying, on the display unit at a display frame rate that is the same as the imaging frame rate, the image data that is outputted from the imaging unit at the imaging frame rate;

wherein:

the slow display control unit displays, in a first display area of the display unit at the display frame rate that is lower than the imaging frame rate, the image data that was imaged by the imaging unit at the imaging frame rate; and the direct display control unit displays in a second display area of the display unit at the display frame rate that is the same as the imaging frame rate, the image data imaged by the imaging unit at the imaging frame rate, along with the slow display control unit displaying the image data in the first display area.

26. The imaging apparatus as set forth in claim 25, wherein in response to a second recording instruction operation, the recording control unit records in the recording unit the image data that is displayed in the second display area by the direct display control unit.

27. The imaging apparatus as set forth in claim 25, wherein in response to the first recording instruction operation, the recording control unit records in the recording unit the image data that is displayed in the first display area by the slow display control unit.

28. The imaging apparatus as set forth in claim 1, wherein the slow display control unit repeats the execution of the slow display process for the image data if the slow display process has been performed for all of the image data imaged over a predetermined time by the imaging unit.

29. The imaging apparatus as set forth in claim 1, further comprising a changing unit for changing the imaging frame rate for continuous shooting imaging by the imaging unit;

wherein the imaging unit perform imaging at the imaging frame rate that has been changed by the changing unit.

30. The imaging apparatus as set forth in claim 1, further comprising a changing unit for changing a slow display time for the slow display process by the slow display control unit;

wherein the slow display control unit performs the slow display process for the image data that was imaged by continuous shooting imaging by the imaging unit, for the amount of slow display time changed by the changing unit.

31. The imaging apparatus as set forth in claim 1, further comprising a shutter button having a half-depressed state and a full-depressed state;

wherein:

the slow display control unit starts the slow display process in response to the slow display instruction operation when the shutter button has been depressed into its half-depressed state and ends the slow display process when depression of the shutter button is released without the shutter button being depressed into its full-depressed state; and the recording control unit records in the recording unit the image data displayed by the slow display control unit in response to the first recording instruction operation when the shutter button is depressed into its full-depressed state.

32. The imaging apparatus as set forth in claim 1, further comprising a slow display information display control unit for displaying information indicating at which timing the image data being subjected to the slow display process has been imaged.

33. The imaging apparatus as set forth in claim 1, further comprising a speed display control unit for displaying a speed of slow display by the slow display control unit.

34. The imaging apparatus as set forth in claim 1, further comprising a slow display time display control unit for displaying a slow display time of slow display by the slow display control unit.

35. A non-transitory recording medium having an imaging control program stored thereon for enabling a computer to record and process images, the computer having an imaging device comprising a display unit, an imaging unit for capturing sequential images of a subject according to a predetermined imaging frame rate and for outputting image data, and a buffer unit for temporarily holding the image data that is sequentially outputted from the imaging unit, the imaging control program being executable to control the computer to perform functions comprising:

a slow display control function for executing a slow display process for slow-motion displaying the image data that is outputted from the imaging unit at the imaging frame rate on the display unit at a display frame rate that is lower than the imaging frame rate by supplying the image data to the display unit via the buffer unit, in response to a slow display instruction;

a buffer control function for controlling, in response to the slow display instruction, the buffer unit to hold image data of a single frame which is inputted to the buffer unit at a time at which the slow display instruction is received, as initial image data for the slow-motion displaying, and to simultaneously hold image data of plural frames which are inputted to the buffer unit subsequently thereafter; and a recording control function to record onto a recording unit, in response to a recording instruction that is received while the slow display control function is executing the slow display process, still image data corresponding to the image of the subject that is displayed on the display unit at a time at which the recording instruction is received.

36. An imaging control method comprising:

capturing sequential images of a subject according to a predetermined imaging frame rate and outputting image data to a buffer;

executing a slow display process by slow-motion displaying outputted image data on a display unit at a display frame rate that is lower than the imaging frame rate by supplying the image data to the display unit via the buffer unit, in response to a slow display instruction;

holding in the buffer, in response to the slow display instruction, image data of a single frame which is inputted to the buffer at a time at which the slow display instruction is received, as initial image data for the slow-motion displaying, and simultaneously holding in the buffer image data of plural frames which are inputted to the buffer subsequently thereafter; and recording onto a recording unit, in response to a recording instruction that is received during the slow display process, still image data corresponding to the image of the subject that is displayed on the display unit at a time at which the recording instruction is received.

* * * * *